(12) United States Patent
Kuroki et al.

(10) Patent No.: US 6,467,289 B2
(45) Date of Patent: Oct. 22, 2002

(54) HOT-WATER SUPPLY SYSTEM WITH HEAT PUMP CYCLE

(75) Inventors: Jyouji Kuroki, Kariya (JP); Hisayoshi Sakakibara, Nishio (JP); Tomohisa Yoshimi, Gamagori (JP); Tomoaki Kobayakawa, Tokyo (JP); Kazutoshi Kusakari, Urawa (JP); Michiyuki Saikawa, Zushi (JP)

(73) Assignees: Denso Corporation, Kariya (JP); Tokyo Electric Power Company, Tokyo (JP); Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 09/873,657

(22) Filed: Jun. 4, 2001

(65) Prior Publication Data

US 2002/0002834 A1 Jan. 10, 2002

(30) Foreign Application Priority Data

Jun. 5, 2000 (JP) ........................................ 2000-167510
Nov. 10, 2000 (JP) ........................................ 2000-344206
Apr. 16, 2001 (JP) ........................................ 2001-116959

(51) Int. Cl.$^7$ ............................ F25D 17/02; F25B 41/00
(52) U.S. Cl. ............................................. 62/201; 62/210
(58) Field of Search .......................... 62/201, 190, 231, 62/207, 210, 157, 238.6

(56) References Cited

U.S. PATENT DOCUMENTS

| | | | | |
|---|---|---|---|---|
| 4,940,079 A | * | 7/1990 | Best et al. | 165/2 |
| 5,081,846 A | * | 1/1992 | Dudley et al. | 62/115 |
| 5,249,432 A | * | 10/1993 | Ichikawa | 62/197 |
| 5,272,885 A | * | 12/1993 | Watanabe | 62/184 |
| 5,465,588 A | * | 11/1995 | McCahill et al. | 62/127 |
| 5,906,104 A | * | 5/1999 | Schwartz et al. | 62/79 |
| 6,314,744 B1 | * | 11/2001 | Ogawa | 62/79 |

FOREIGN PATENT DOCUMENTS

DE 19955339 A1 * 5/2000

* cited by examiner

Primary Examiner—William C Doerrler
(74) Attorney, Agent, or Firm—Harness, Dickey & Pierce, PLC

(57) ABSTRACT

In a hot-water supply system with a heat pump cycle, a control unit controls operation of an expansion valve based on a temperature difference between a refrigerant temperature at an outlet side of a refrigerant passage in a water heat exchanger and a water temperature at an inlet side of a water passage in the water heat exchanger. When the expansion valve is controlled in a direction increasing a valve opening degree, the control unit sets an upper limit opening degree of the expansion valve, for obtaining a refrigerant pressure corresponding to a target hot-water temperature, and controls the expansion valve in an opening degree range smaller than the upper limit opening degree.

30 Claims, 21 Drawing Sheets

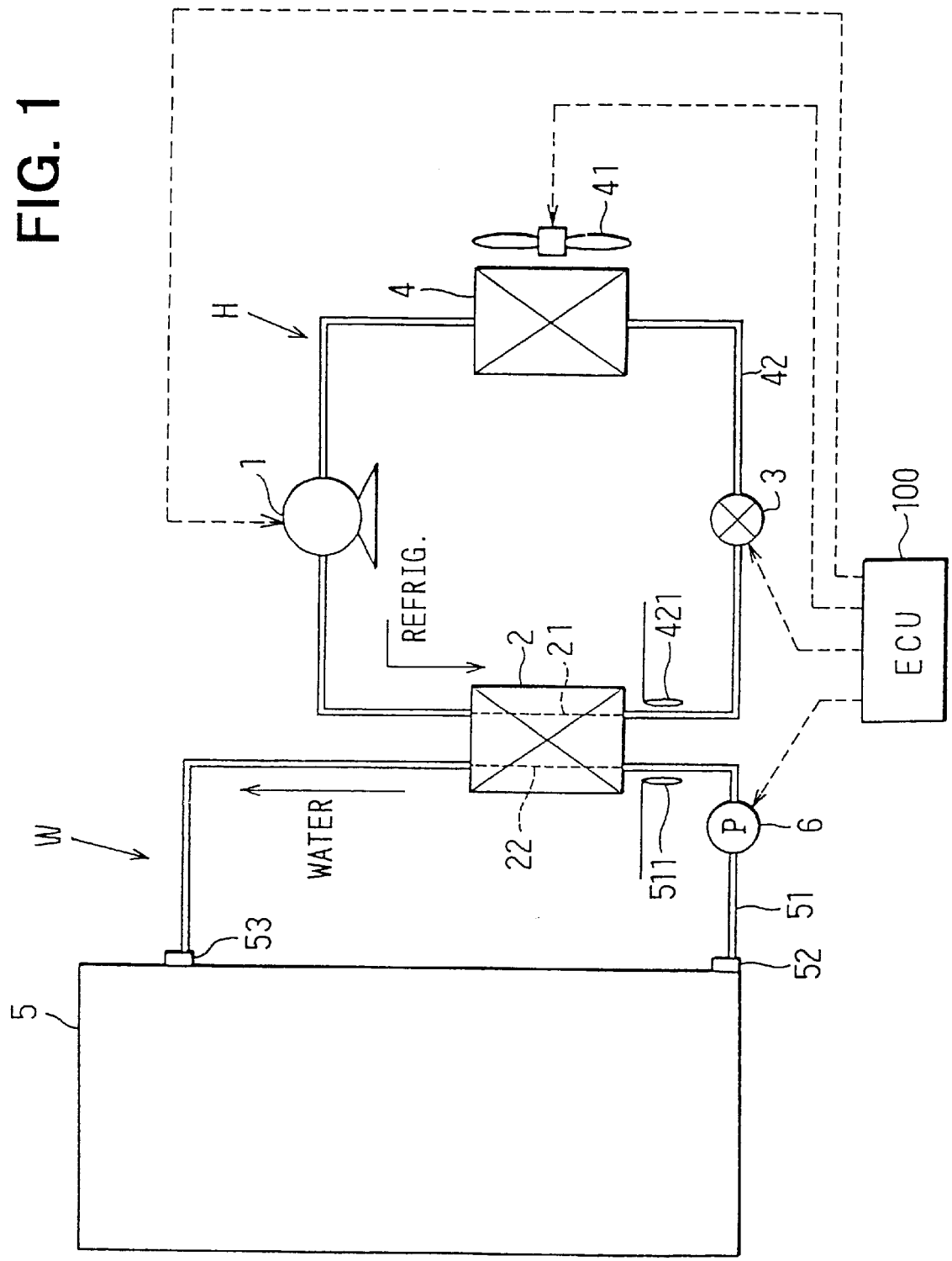

FIG. 2A $\Delta T = Tr - Tw$

| $\Delta T$ | $\Delta T < 9°C$ | $\Delta T > 11°C$ |
|---|---|---|
| OPERATION OF EXPANSION VALVE | VALVE OPENING DIRECTION | VALVE CLOSING DIRECTION |

FIG. 2B

| Tw | Tw < 40°C | Tw ≧ 40°C |
|---|---|---|
| OPERATION OF EXPANSION VALVE | PERFORM CONTROL OF FIG. 2A | CONTROL VALVE OPENING DEGREE AT UPPER LIMIT OPENING DEGREE |

| ΔT | ΔT<10 | ΔT>10 |
|---|---|---|
| OPERATION OF EXPANSION VALVE | VALVE OPENING DIRECTION | VALVE CLOSING DIRECTION |

HOT-WATER SUPPLY SYSTEM WITH HEAT PUMP CYCLE

CROSS-REFERENCE TO RELATED APPLICATION

This application is related to Japanese Patent Applications No. 2000-167510 filed on Jun. 5, 2000, No. 2000-344206 filed on Nov. 10, 2000, and No. 2001-116959 filed on Apr. 16, 2001, the contents of which are hereby incorporated by reference.

BACKGROUND OF THE INVENTION

1. Field of the Invention

The present invention relates to a heat-pump type hot-water supply system, and more particularly, relates to technique for restraining a decrease of boiling-up ability resulting from an increase in a water temperature in a final stage of boiling-up and for reducing running cost by optimizing a boiling-up terminating condition.

2. Description of Related Art

Applicants of the present application invented a hot-water supply system with a heat pump cycle which includes a refrigerant compressor, a refrigerant flow passage of a water heat exchanger, an expansion valve, an air heat exchanger provided with an outdoor fan, and a hot water circuit. In the hot water circuit, a hot-water storage tank for storing hot water for a hot-water supply and a hot-water flow passage of the water heat exchanger are connected through a hot-water pipe, and a pump is provided in the hot-water pipe between the hot-water storage tank and the hot-water flow passage. In addition, a difference between a refrigerant temperature at an outlet side of the refrigerant flow passage and a hot-water temperature at an inlet side of the hot-water flow passage is compared with a target temperature difference, and a valve opening degree of the expansion valve is controlled to improve a cycle efficiency (coefficient of performance, COP).

When the temperature of the hot-water within the hot-water circuit is high, it becomes difficult to cause a temperature difference between the refrigerant temperature on the outlet side of the refrigerant flow passage and the hot-water temperature on the inlet side of the hot-water flow passage, and the expansion valve is controlled in a direction that opens the expansion valve. As a result, a high-pressure side refrigerant pressure within the heat pump cycle becomes lower. Particularly, when temperature of hot-water within the hot-water storage tank has lowered by stopped operation for many hours and thereafter the hot-water is boiled up again, or when the temperature of hot-water within the hot-water circuit including the hot-water storage tank is ununiform, there arises a problem.

In addition, because the temperature of hot water in the hot water circuit increases with an elapse time of operation of the hot-water supply system, the temperature difference between the refrigerant temperature on the outlet side of the refrigerant flow passage and the hot-water temperature on the inlet side of the hot-water flow passage becomes smaller in a final stage of boiling up of hot water, and the control of the expansion valve due to the temperature difference becomes difficult.

SUMMARY OF THE INVENTION

In view of the foregoing problems, it is an object of the present invention to provide a hot-water supply system with a heat pump cycle, capable of preventing a decrease of hot-water supply ability due to a lowered refrigerant pressure within the heat pump cycle.

It is a second object of the present invention to provide a hot-water supply system with a heat pump cycle, capable of resolving insufficient ability and securing a target hot-water supply temperature during a boiling-up operation without adding any new functional components, and improving stability and reliability of a hot-water control in low cost.

A third object according to the present invention is to provide a hot-water supply system with a heat pump cycle, in which the boiling-up operation is performed in consideration of electric power rate per unit time based on a time-of-day rate system, and running cost is reduced.

It is a fourth object of the present invention to provide a hot-water supply system with a heat pump cycle, which accurately perform a control immediately before boiling-up.

According to an aspect of the present invention, in a hot-water supply system, a control unit controls operation of an expansion valve in a first direction increasing an opening degree of the expansion valve, when a temperature difference, between a refrigerant temperature at an outlet side of a refrigerant passage in a fluid heat exchanger and a fluid temperature at an inlet side of a fluid passage in the fluid heat exchanger, is smaller than a target temperature difference. On the other hand, the control unit controls operation of the expansion valve in a second direction decreasing the opening degree of the expansion valve, when the temperature difference is larger than the target temperature difference. In addition, when the temperature difference is smaller than the target temperature difference and the expansion valve is controlled in the first direction, the control unit controls a high-pressure side refrigerant pressure before being decompressed in the heat pump cycle to be equal to or higher than a predetermined refrigerant pressure in such a manner that the fluid has the target fluid temperature. Accordingly, it is possible to maintain the high-pressure side refrigerant pressure of the heat pump cycle to exceed the predetermined refrigerant pressure, and the target supply temperature of the fluid can be secured in the hot-water supply system. As a result, the hot-water supply system can prevent a decrease of hot-water supply ability due to a lowered refrigerant pressure within the heat pump cycle.

According to an another aspect of the present invention, in a hot-water supply system, when the control unit determines a heat radiation from the refrigerant to air in an air heat exchanger, the control unit controls a high-pressure side refrigerant pressure before being decompressed in the heat pump cycle to be equal to or higher than a predetermined refrigerant pressure at least until the heat radiation stops. Therefore, the high-pressure side refrigerant pressure in the heat pump cycle can be maintained at a pressure equal to or larger than the predetermined pressure, and the target hot-water supply temperature can be obtained without a heat loss when the fluid is water.

According to a further another aspect of the present invention, in a hot-water supply system, when the fluid temperature at the inlet side of the fluid passage in the fluid heat exchanger exceeds a predetermined temperature, the control unit sets a target pressure to an upper limit pressure that is lower than a compression resistance pressure of materials constituting the heat pump cycle, so that the high-pressure side refrigerant pressure of the heat pump cycle corresponds to the target pressure. Therefore, the high-pressure side refrigerant pressure in the heat pump cycle can be maintained at a pressure equal to or larger than the predetermined pressure, and the target hot-water supply temperature can be obtained when the fluid is water.

Preferably, the control unit presumes the high-pressure side refrigerant pressure based on the fluid temperature on the inlet side of the fluid passage in the fluid heat exchanger and the refrigerant temperature on the inlet side of an air heat exchanger, and increases or decreases the valve opening degree of the expansion valve in such a manner that this presumed refrigerant pressure corresponds to the upper limit pressure. Accordingly, when a relationship between the refrigerant temperature on the inlet side of the air heat exchanger and the high-pressure side refrigerant pressure is set in graphical or map based on for each fluid temperature on the inlet side of the fluid passage in the fluid heat exchanger, the high-pressure side refrigerant pressure will be presumed, based on the fluid temperature on the inlet side of the fluid passage in the fluid heat exchanger and refrigerant temperature on the inlet side of an air heat exchanger. Since there is no need to provide a high-pressure side refrigerant pressure sensor, cost for the component can be reduced and a maintenance for the high-pressure side refrigerant pressure sensor is not required.

Preferably, when the fluid temperature on the inlet side of the fluid flow passage exceeds the predetermined temperature, the high-pressure side refrigerant pressure of the heat pump cycle is controlled to correspond to the target pressure only in a midnight time zone which is cheapest in power rate. Thereby, the running cost of the hot-water supply system can be reduced.

According to a further another aspect of the present invention, in a hot-water supply system, the control unit has heat-storing amount calculating means for calculating a heat storage amount based on an amount of fluid in the tank and temperature of the fluid in the tank. Further, in a midnight time zone in which the power rate is set at the lowest, the control unit starts a boiling-up operation when the heat storage amount of hot water within the tank is smaller than a first predetermined amount, and stops the boiling-up operation when at least one of a first condition, where the temperature of the fluid on the inlet side of the fluid flow passage is higher than a first preset temperature, and a second condition, where the heat storage amount of hot water within the tank becomes larger than the first predetermined amount, is satisfied. In a morning and evening time zone in which the power rate is set comparatively low, the control unit starts the boiling-up operation when the heat storage amount of the fluid within the tank is smaller than a second predetermined amount, and stops the boiling-up operation when at least one of a third condition, where the temperature of fluid on the inlet side of the fluid flow passage exceeds a second preset temperature, a fourth condition where the heat storage amount of the fluid within the tank is larger than the second predetermined amount, is satisfied. In addition, in a daytime time zone in which the power rate is set high, the control unit starts the boiling-up operation when the heat storage amount of fluid within the tank is smaller than a third predetermined amount, and stops the boiling-up operation when at least one of a fifth condition, where the temperature of the fluid on the inlet side of the fluid flow passage exceeds a third preset temperature, and a second condition, where a heat storage amount of the fluid within the tank reaches the third predetermined amount, is satisfied. Accordingly, the hot-water supply system is capable of independently determining a start determining condition of the boiling-up operation of the fluid (e.g., water) and a termination determining condition of the boiling-up operation for each time zone in accordance with a pattern in which the user uses the fluid within the tank. As a result, the power rate can be made cheap while depletion of the supply fluid is not caused in all time zones. Thus, the running cost of the hot-water supply system can be reduced.

According to a further another aspect of the present invention, when temperature of the fluid at the inlet side of the fluid passage is lower than a control change temperature, the control unit controls the opening degree of the expansion valve so that a temperature difference between the refrigerant temperature at the outlet side of the refrigerant passage and the fluid temperature at the inlet side of the fluid passage is within a predetermined range. Further, when the temperature of the fluid at the inlet side of the fluid passage is equal to or higher than the control change temperature, while the control unit controls the capacity of the pump at a constant value, the control unit controls the opening degree of the expansion valve to be increased when the temperature of the fluid at an outlet side of the fluid passage is higher than a first set temperature, and controls the opening degree of the expansion valve to be decreased when the temperature of the fluid at the outlet side of the fluid passage is lower than a second set temperature lower than the first set temperature. Therefore, the hot-water supply system can accurately perform a control immediately before the boiling-up. Further, the hot-water supply system can resolve insufficient ability and secure a target fluid supply temperature during the boiling-up operation without adding any new functional components, and improve stability and reliability of the fluid temperature control in low cost.

According to a further another aspect of the present invention, when temperature of the fluid at the inlet side of the fluid passage is lower than a control change temperature, the control unit controls the opening degree of the expansion valve so that a temperature difference between the refrigerant temperature at the outlet side of the refrigerant passage and the fluid temperature at the inlet side of the fluid passage is within a predetermined range. On the other hand, when the temperature of the fluid at the inlet side of the fluid passage is equal to or higher than the control change temperature, the control unit controls the opening degree of the expansion valve to be decreased when a refrigerant temperature discharged from an outlet of the compressor is equal to or lower than a first refrigerant set temperature, and controls the opening degree of the expansion valve to be increased when the refrigerant temperature discharged from the outlet of the compressor is equal to or higher than a second refrigerant set temperature set higher than the first refrigerant set temperature. In addition, the control unit controls the capacity of the pump to be increased when the temperature of the fluid at the outlet side of the fluid passage is equal to or higher than a first fluid set temperature, and controls the capacity of the pump to be decreased when the temperature of the fluid at the outlet side of the fluid passage is equal to or lower than a second fluid set temperature lower than the first fluid set temperature. Accordingly, the hot-water supply system can accurately perform a control immediately before the boiling-up.

BRIEF DESCRIPTION OF THE DRAWINGS

Additional objects and advantages of the present invention will be more readily apparent from the following detailed description of preferred embodiments when taken together with the accompanying drawings, in which:

FIG. 1 is a schematic diagram showing a hot-water supply system with a heat pump cycle, according to a first preferred embodiment of the present invention;

FIG. 2A is a view for explaining a control operation of an expansion valve in a low water temperature, and FIG. 2B is a view for explaining the control operation of the expansion valve based on a water temperature Tw, according to the first embodiment;

DETAILED DESCRIPTION OF THE PRESENTLY PREFERRED EMBODIMENTS

Preferred embodiments of the present invention will be described hereinafter with reference to the accompanying drawings.

Figure 3:
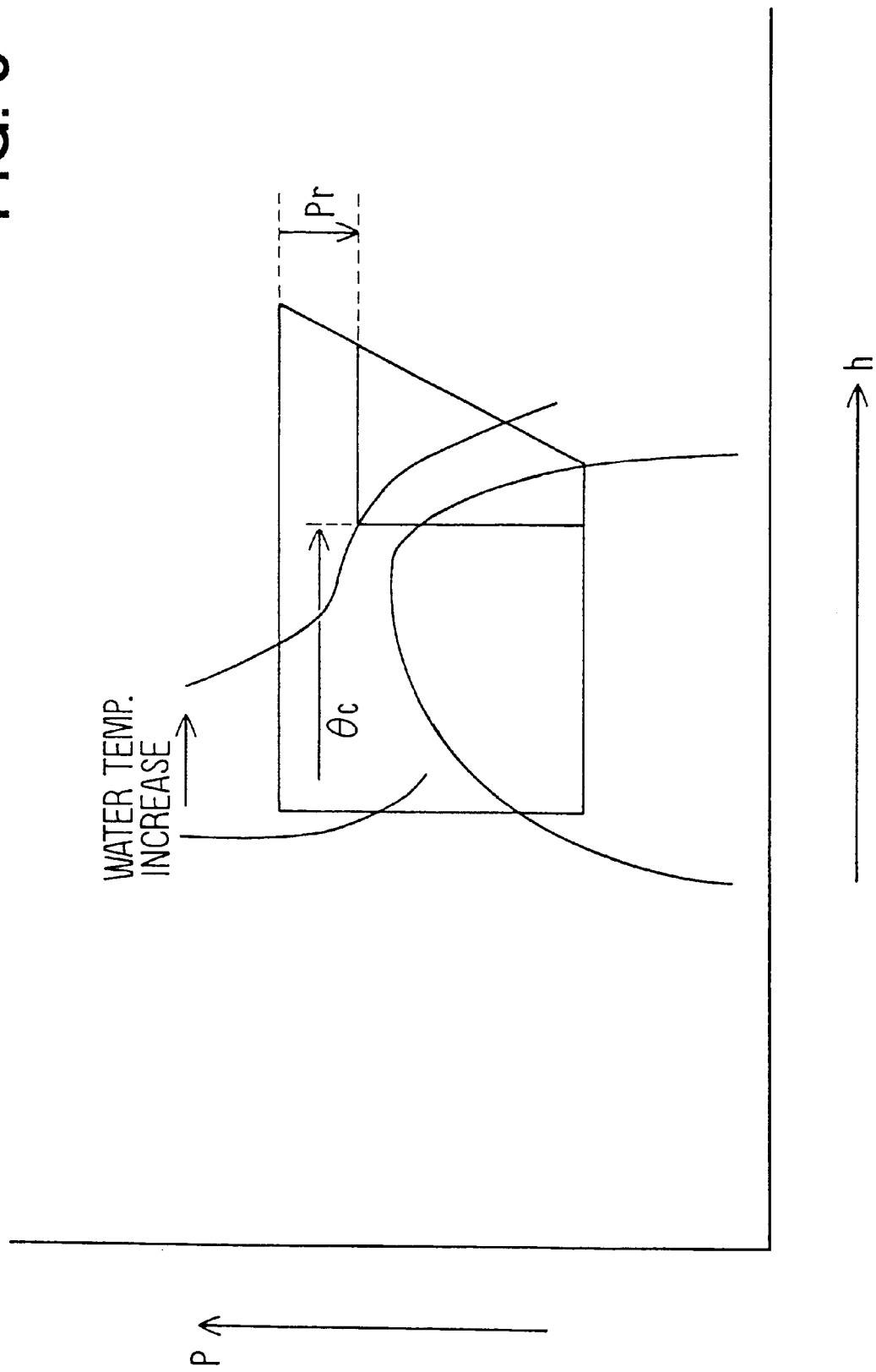
FIG. 3 is a p-h diagram (Mollier diagram) of the heat pump cycle when a water temperature increases.

A first preferred embodiment of the present invention will be now described with reference to FIGS. 1–3. As shown in FIG. 1, a hot-water supply system is provided with a heat pump cycle H, a hot water circuit W and a control unit 100 (ECU). The heat pump cycle H includes a compressor 1, a refrigerant flow passage 21 of a water heat exchanger 2, an expansion valve 3, an air heat exchanger 4 provided with an outdoor fan 41 and an accumulator (not shown). These equipments of the heat pump cycle H are connected into through a refrigerant pipe 42 to form a closed refrigerant cycle. In the hot water circuit W, a hot-water storage tank 5 for storing hot-water for a hot-water supply and a hot-water flow passage 22 of the water heat exchanger 2 are connected through a hot-water pipe 51, and a pump 6 is provided in the hot-water pipe 51 between the hot-water storage tank 5 and the water heat exchanger 2. In addition, the control unit 100 is provided for controlling operation of equipments such as the compressor 1, a voltage applied to an electrical motor of the outdoor fan 41, the expansion valve 3 and the pump 6, for example.

The compressor 1 is driven by an electrical motor incorporated therein, and gas refrigerant introduced from the accumulator (not shown) is compressed at a critical pressure or higher to be discharged. This compressor 1 increases or decreases its ability (number of revolutions) in accordance with an energizing amount to the electrical motor.

The water heat exchanger 2 has therein the refrigerant flow passage 21 through which refrigerant (carbon dioxide) discharged from the compressor 1 flows, and the hot-water flow passage 22 through which hot water flows. Thus, high-temperature refrigerant (hot gas refrigerant), which is discharged from the compressor 1 and flows through the refrigerant flow passage 21, radiates heat to water flowing from the hot-water storage tank 5 so that the temperature of the water flowing through the water heat exchanger 2 is increased. As shown in FIG. 1, on the inlet side of the hot-water flow passage 22, a water temperature sensor 511 is disposed, and on the outlet side of the refrigerant flow passage 21, a refrigerant temperature sensor 421 is disposed.

The expansion valve 3 has a valve element driven by an actuator, and a valve opening degree of the expansion valve 3 can be made variable in accordance with an amount of energization to the actuator. In the air heat exchanger 4, refrigerant from the expansion valve 3 is heat-exchanged with outside air blown by the outdoor fan 41 for being evaporated. Refrigerant from the air heat exchanger 4 flows into the accumulator (not shown), and is separated into gas refrigerant and liquid refrigerant. Gas refrigerant separated in the accumulator is introduced to the compressor 1 to be compressed.

The hot-water pipe 51 is provided for connecting a hot-water outlet 52 provided in a lower part of the hot-water storage tank 5 and a hot-water inlet 53 provided in an upper part of the hot-water storage tank 5.

The control unit 100 controls the electrical motor of the compressor 1, the outdoor fan 41 and the expansion valve 3 on the basis of output signals from the water temperature sensor 511 and the refrigerant temperature sensor 421 and the like. A sensor (not shown) can be provided at the outlet side of the hot-water flow passage 22. The control unit 100 controls the pump 6 to control a hot-water flow amount in the hot-water flow passage 22 in such a manner that temperature of hot-water introduced into the hot-water storage tank 5 becomes a target hot-water supply temperature.

Next, an operation of the hot-water supply system will be now described. Water (hot-water) within the hot-water storage tank 5 flows from the hot-water outlet 52 by the operation of the pump 6, passes through the hot-water flow passage 22 in the water heat exchanger 2, and returns into the hot-water storage tank 5 from the hot-water inlet 53, through the hot-water pipe 51. On the other hand, refrigerant compressed at high temperature and high pressure by the compressor 1 flows through the refrigerant flow passage 21 of the water heat exchanger 2 to heat water (hot-water) flowing through the hot-water flow passage 22 of the water heat exchanger 2 in the opposite direction. While refrigerant passes through the expansion valve 3, the refrigerant expands to become at low pressure. The low-pressure refrigerant from the expansion valve 3 heat-exchanges with outside air blown by the outdoor fan 41 within the air heat exchanger 4 to be evaporated, and returns to the compressor 1 after passing through the accumulator. When a water temperature Tw flowing into the water flow passage 22 is low, the expansion valve 3 is controlled by the control unit 100 on the basis of a temperature difference $\Delta T$ between a refrigerant outlet temperature and a water inlet temperature in the water heat exchanger 2, as shown in FIG. 2A.

That is, the temperature difference $\Delta T$ is a difference between the refrigerant outlet temperature Tr detected by the refrigerant temperature sensor 421 and the water temperature Tw detected by the water temperature sensor 511 ($\Delta T = Tr - Tw$). In the first embodiment, when the water temperature Tw is lower than a predetermined temperature (e.g., 40° C.), the valve opening degree of the expansion valve 3 is controlled in accordance with whether or not this temperature difference $\Delta T$ is within a target temperature difference range (for example, 9° C.–11° C.). Specifically, when the temperature difference $\Delta T$ is smaller than 9° C., the expansion valve 3 is operated in a direction that opens the valve. On the other hand, when the temperature difference is larger than 11° C., the expansion valve 3 is operated in a direction that closes the valve. The target temperature difference range can be made constant, and may be set to be changed on the basis of the outside air temperature and the like.

When the above-described control is performed in a state in which the water temperature Tw is high (40° C. or higher), the temperature difference $\Delta T$ between the refrigerant temperature Tr on the outlet side of the refrigerant flow passage 21 and the water temperature Tw detected by the water temperature sensor 511 becomes smaller, so that the expansion valve 3 is controlled in the direction for opening the expansion valve 3. Thereby, as indicated by the arrow Pr in FIG. 3, high-pressure side refrigerant pressure within the heat pump cycle decreases, and the hot-water supply ability is decreased. As a result, there is cause a disadvantage that the hot-water supply temperature becomes unable to be maintained at the target hot-water supply temperature. Accordingly, water-heating capacity Qc of the heat pump cycle H can be reduced due to the decrease Pr of the high-pressure side refrigerant pressure, as shown in FIG. 3.

In the first embodiment, when the water temperature Tw (i.e., temperature detected by the water temperature sensor 511) exceeds 40° C., as shown in FIG. 2B, the opening degree of the expansion valve 3 is set at an upper limit opening degree at which high-pressure side refrigerant pressure corresponding to the target hot-water supply temperature (about 90° C.) can be obtained. Even when a control instruction for opening the expansion valve 3 more than the upper limit opening degree is output on the basis of the temperature difference $\Delta T$, the opening degree of the expansion valve 3 is opened only up to the upper limit opening degree, irrespective of the control instruction.

Since the high-pressure side refrigerant pressure varies even at the same opening degree of the expansion valve 3 based on the state (outside air temperature, heat radiation amount and heat absorption amount of refrigerant) of the heat pump cycle H, the above-described upper limit opening degree is preferably set in accordance with the state of the heat pump cycle H. Thereby, even when the water temperature is higher than a predetermined temperature (e.g., 40° C. or higher), cycle high pressure in the heat pump cycle can be maintained, and therefore, the hot-water supply ability can be secured, and the hot-water supply temperature can be maintained at the target hot-water supply temperature.

In addition, since there is no need to add functional components such as an electromagnetic valve, a check valve or an electric heater, the reliability and durability of the hot-water supply system can be improved.

A second preferred embodiment of the present invention will be now described with reference to FIGS. 4A, 4B, 5A and 5B. A base structure of a hot-water supply system according to the second embodiment is similar to that of the above-described first embodiment. However, in the second embodiment, the control operation of the control unit 100 is different from that of the first embodiment. That is, in the second embodiment, when water temperature Tw (i.e., temperature detected by the water temperature sensor 511) is equal to or higher than a predetermined temperature (e.g., 40° C.), an increasing ratio of a rotation speed of the compressor 1 is determined in a range of −15% to +15% on the basis of a temperature difference [To−Tw'] between a target water temperature To (about 90° C.) and the present hot-water supply temperature Tw' at the outlet side of the hot-water flow passage 22 in accordance with the graph shown in FIG. 4A. At this time, the expansion valve 3 is maintained at a constant opening degree near the upper limit opening degree or is operated in a direction for reducing the opening degree. Thereby, even when the hot-water supply ability is prone to be insufficient, such as in a case where the water temperature Tw is equal to or higher than the predetermined temperature (e.g., 40° C.), the high-pressure in the heat pump cycle H can be maintained. Therefore, it is possible to secure the hot-water supply ability in the hot-water supply system, and to maintain the hot-water supply temperature at the target hot-water supply temperature To. That is, when the water temperature cannot be raised up to the target hot-water supply temperature To due to the insufficient hot-water supply ability, the rotation speed (rotation number) of the compressor 1 is increased based on the difference of To−Tw, whereby the high-pressure side refrigerant pressure of the heat pump cycle H is increased to increase the hot-water supply temperature Tw' to the target hot-water supply temperature To.

Figure 4A:
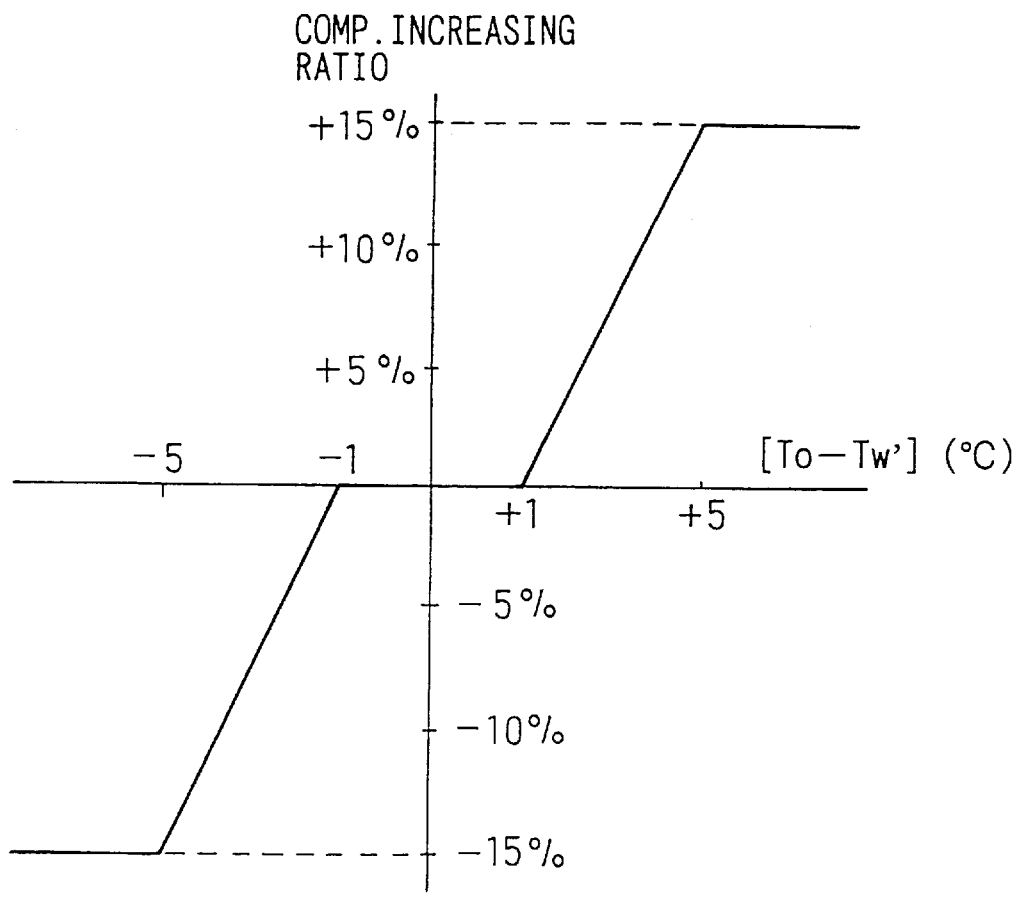
FIG. 4A is a graph showing a compressor control based on a temperature difference [To–Tw'] between a target hot-water supply temperature To and a present water supply temperature Tw'.
Figure 4B:
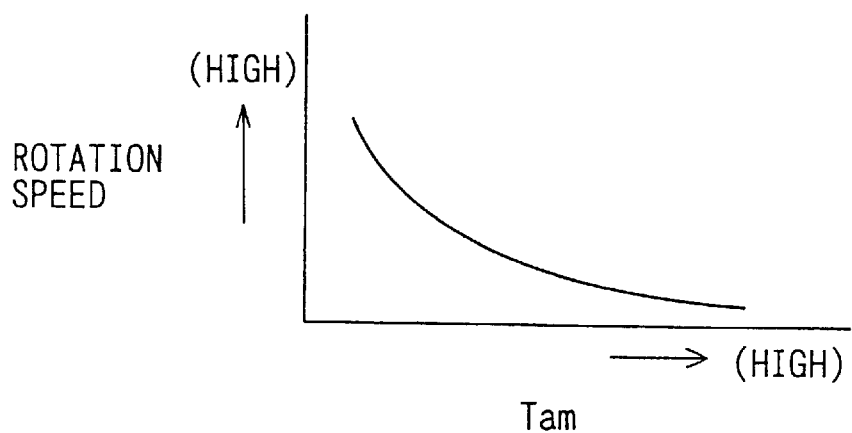
FIG. 4B is a graph of a reference pattern showing a relationship between a rotation speed of the compressor and an outside air temperature Tam, according to the second embodiment.

In this respect, in order to obtain high coefficient of performance (COP) in the heat pump cycle H, a reference pattern shown in FIG. 4B is set for the rotation speed of the compressor 1. When the sufficient hot-water supply ability is obtained (i.e., target hot-water supply temperature To<detected hot-water supply temperature Tw), the rotation speed of the compressor 1 is preferably slowed down in accordance with the reference pattern in FIG. 4B. Since there is no need to add functional components such as an electromagnetic valve, a check valve or an electric heater in the hot-water supply system, the reliability and durability will be improved.

Figure 5A:
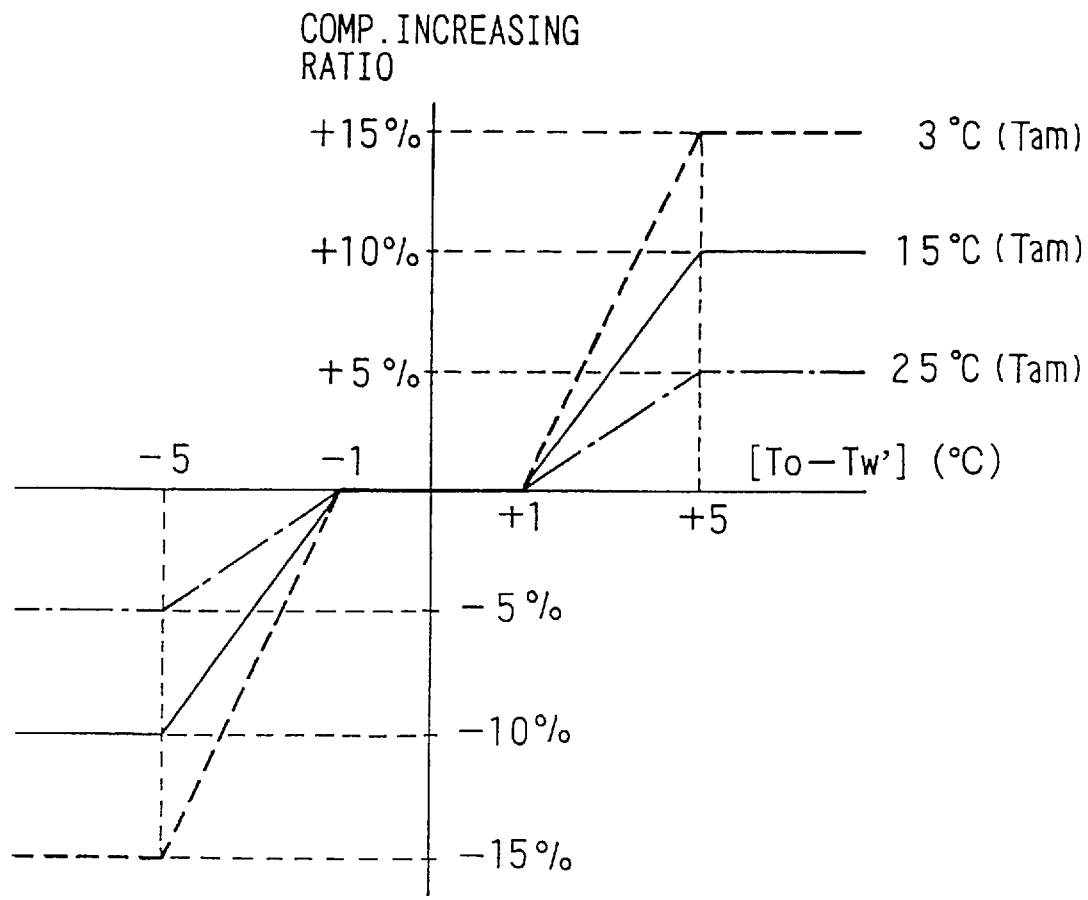
FIG. 5A is a graph showing a compressor control based on the outside air temperature Tam, and the temperature difference [To–Tw'] between the target hot-water supply temperature To and the present water supply temperature Tw'.

An upper limit value and a lower limit value of the increasing ratio in the rotation speed of the compressor 1 can be set to be changed in accordance with the outside air temperature Tam. In addition, at the same outside air temperature Tam, the increasing ratio of the rotation speed of the compressor 1 is changed on the basis of the temperature difference (To−Tw') between the target hot-water supply temperature To and the present hot-water supply temperature Tw' as shown in FIG. 5A. For example, at the outside air temperature Tam of 3° C., the upper limit value of the increasing ratio of the compressor rotation speed is set at +15%, and the lower limit value thereof is set at −15%. At the outside air temperature of 25° C., the upper limit value of the increasing ratio of the compressor rotation speed is set at +5%, and the lower limit value thereof is set at −5%. In this case, because the cycle high pressure in the heat pump cycle H can be maintained even in a state where the atmosphere heat absorption is difficult to be performed at a low outside air temperature, it is possible to secure the hot-water supply ability and to maintain the hot-water supply temperature at the target hot-water supply temperature To.

Figure 5B:
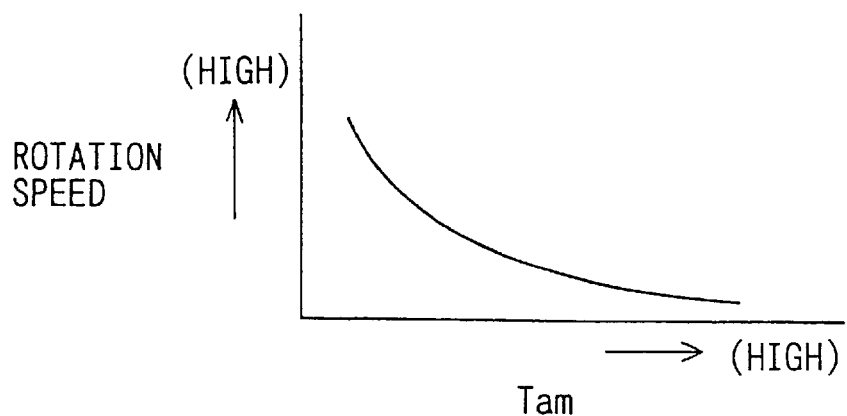
FIG. 5B is a graph of a reference pattern showing a relationship between the rotation speed of the compressor and the outside air temperature Tam, according to the second embodiment.
Figure 6:
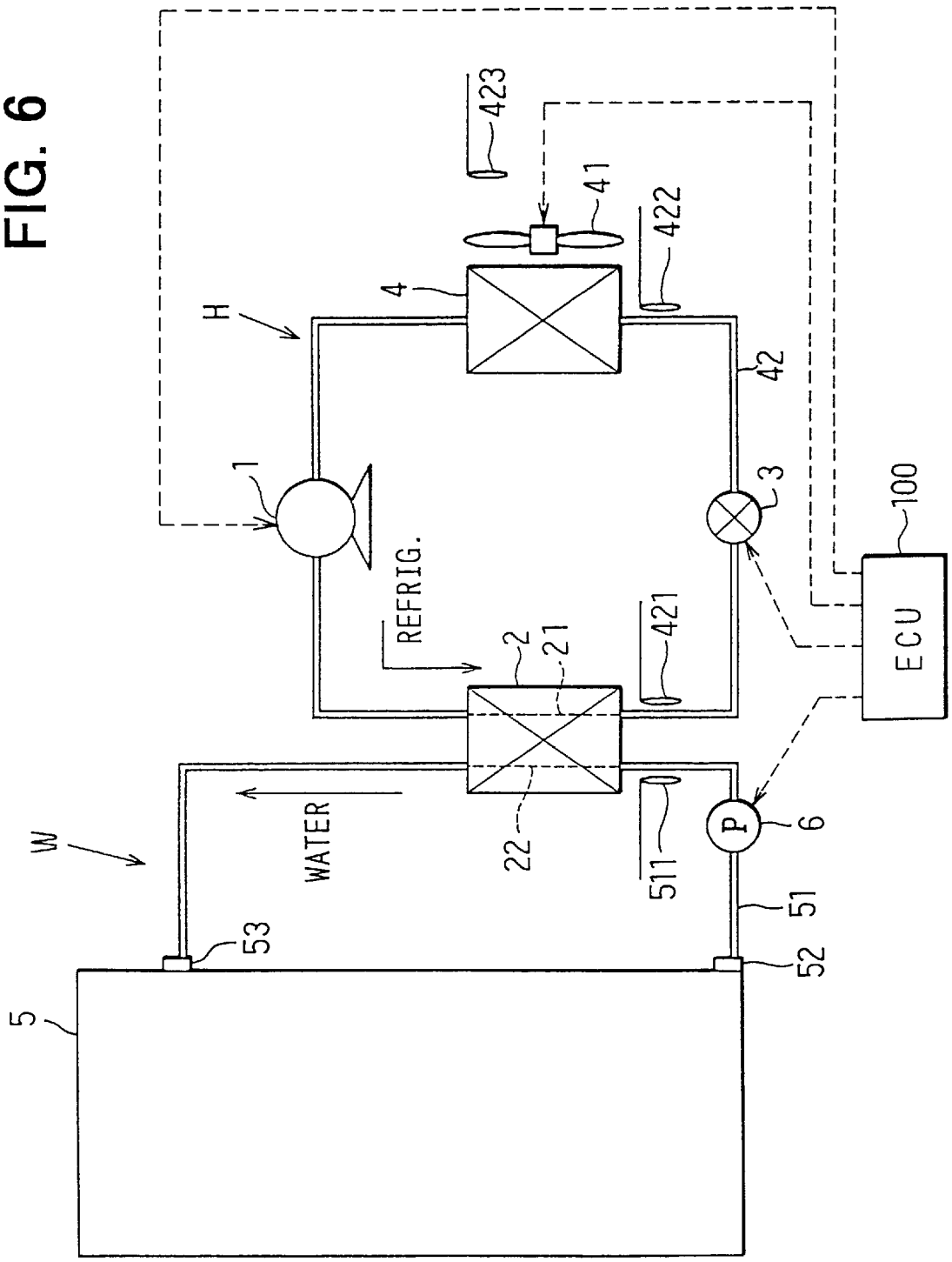
FIG. 6 is a schematic diagram showing a hot-water supply system with a heat pump cycle, according to a third preferred embodiment of the present invention.

In the second embodiment, after the water temperature Tw' becomes the target water temperature To, the rotation speed of the compressor 1 can be controlled in accordance with the reference pattern in FIG. 5B. In this case, the coefficient of performance (COP) in the heat pump cycle H can be further improved.

In the second embodiment, the increasing ratio in the rotation speed of the compressor 1 is set in accordance with the temperature difference (To−Tw') between the target hot-water supply temperature To and the actual hot-water supply temperature Tw'. However, the opening degree of the expansion valve 3 may be F/B controlled in accordance with the temperature difference (To−Tw'). In this case, if the target hot-water supply temperature To>the actual hot-water supply temperature Tw', the expansion valve 3 is driven in the direction reducing the opening degree. On the other hand, when the target hot-water supply temperature To<the actual hot-water supply temperature Tw, the expansion valve 3 is operated in the direction increasing the opening degree. Further, both control of the rotation speed of the compressor 1 and control of opening degree of the expansion valve 3 can be performed at the same time.

Next, with reference to FIGS. 6 to 9, the description will be made of a third preferred embodiment according to the present invention. A hot-water supply system of the third embodiment is different from the hot-water supply system of the above-described first embodiment in the following point. In the third embodiment, a refrigerant inlet temperature sensor 422 for detecting temperature of refrigerant entering the air heat exchanger 4 is disposed in the refrigerant pipe 42 at the inlet side of the air heat exchanger 4. In addition, an outside air temperature sensor 423 for detecting the outside air temperature Tam is disposed at a position in the vicinity of the outdoor fan 41.

Next, an operation of the hot-water supply system according to the third embodiment will be now described. In the above-described first embodiment, as shown in FIG. 2A, the expansion valve 3 is controlled by the control unit 100 on the basis of the temperature difference $\Delta T$ (Tr−Tw) when the water temperature is lower than the predetermined temperature (e.g., 40° C.). That is, temperature difference $\Delta T$ is the difference between the refrigerant outlet temperature Tr detected by the refrigerant temperature sensor 421 and the water temperature Tw detected by the water temperature sensor 511, and the opening degree of the expansion valve 3 is be controlled in accordance with whether or not this temperature difference $\Delta T$ is within the target temperature difference range (for example, 9° C. to 11° C.). In this respect, if the temperature difference $\Delta T$ is smaller than 9° C., the expansion valve 3 will be driven in the direction increasing the valve opening degree, and if larger than 11° C., the expansion valve 3 will be driven in the direction decreasing the valve opening degree. The target temperature difference range may be constant, and may be changed on the basis of the outside air temperature and the like.

Figure 7:
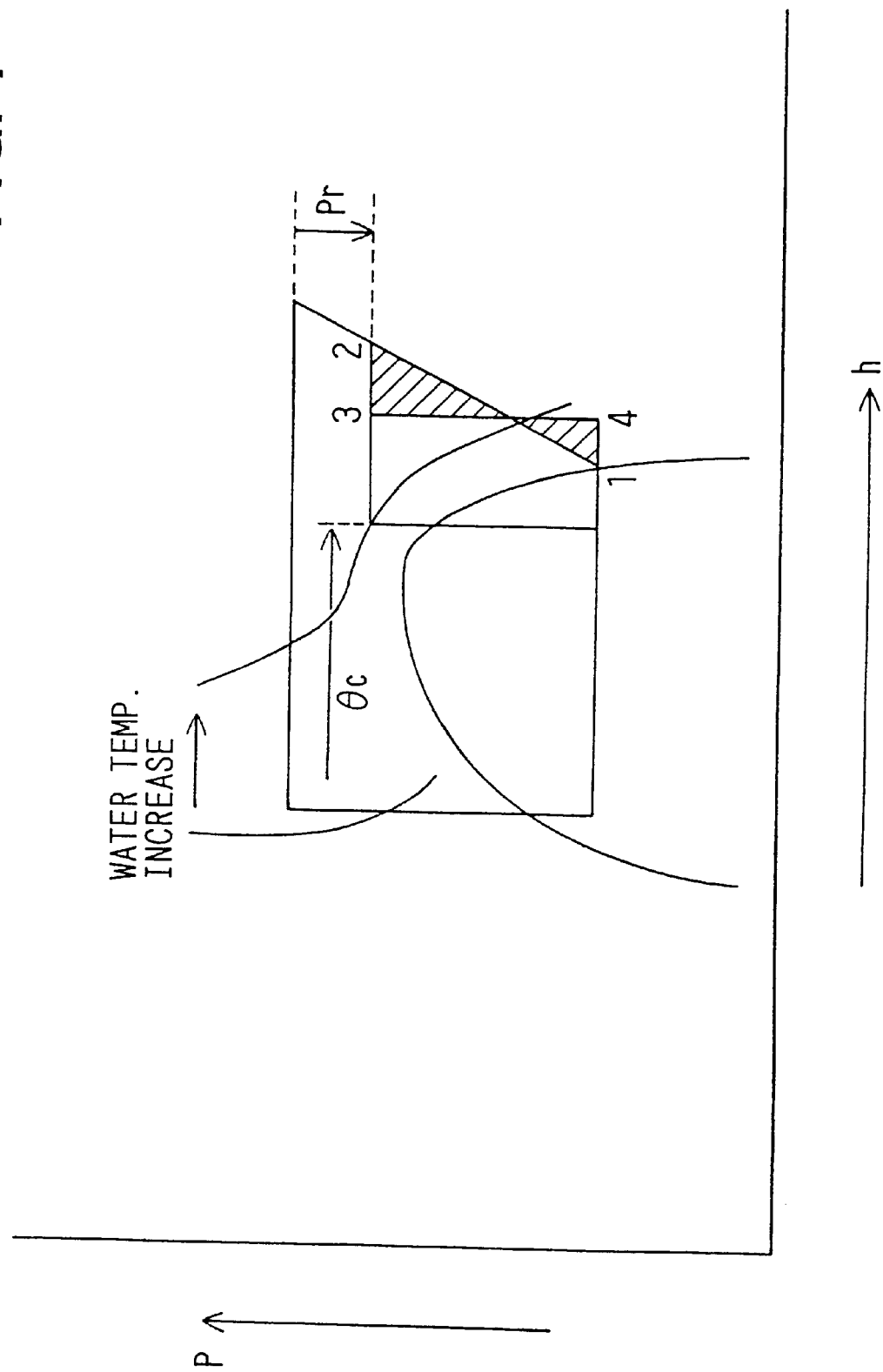
FIG. 7 is a p-h diagram (Mollier diagram) of the heat pump cycle when a high water temperature state is continued.

If the control operation is continued in a state in which the water temperature is higher than a predetermined temperature (40° C.), the temperature difference $\Delta T$ becomes smaller so that the expansion valve 3 is controlled in the direction for increasing the opening degree of the expansion valve 3 so that the refrigerant pressure within the heat pump cycle H becomes lower. When the cycle high pressure of the heat pump cycle lowers, as shown in FIG. 7, the cycle operation advances as follows: compressor compression (state 1→state 2), heat exchange (state 2→state 3) in the water heat exchanger 2, decompression (state 3→state 4) by the expansion valve 3, and heat radiation (state 4→state 1) in the air heat exchanger 4. Accordingly, as shown in FIG. 7 heat loss is caused.

Figure 8:
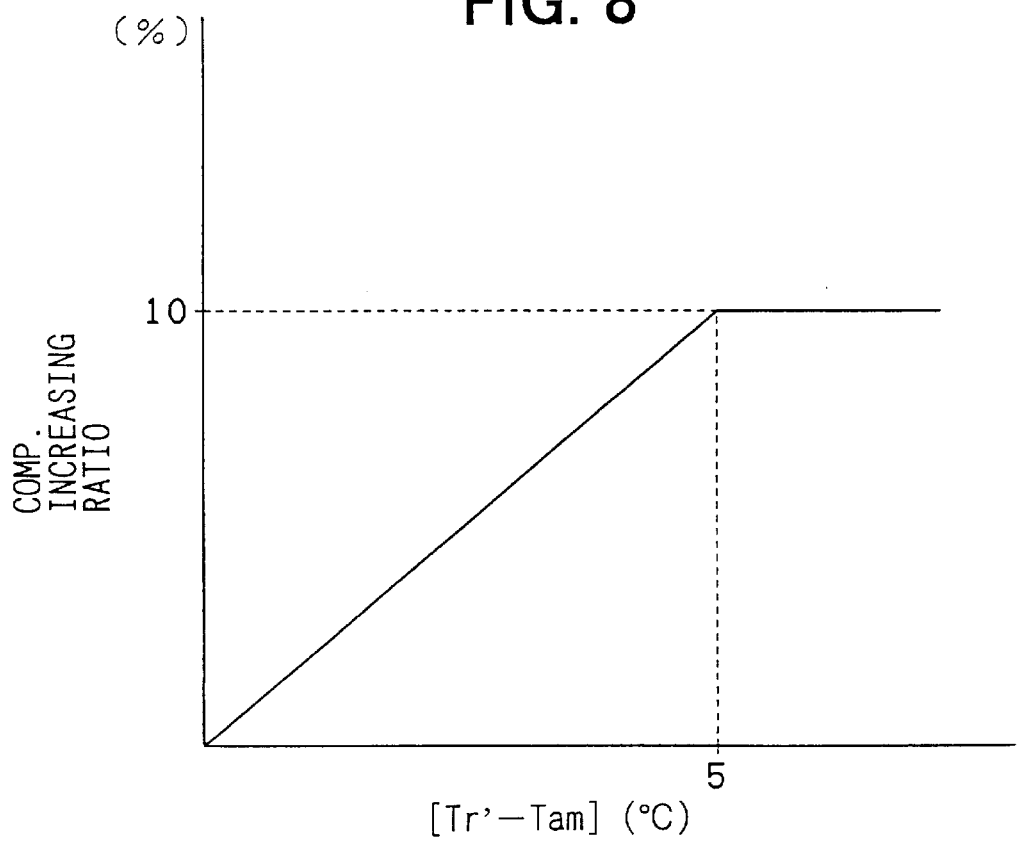
FIG. 8 is a graph for determining a compressor increasing ratio based on a temperature difference [Tr'–Tam] between a refrigerant temperature Tr' flowing into a water heat exchanger and an outside air temperature Tam, according to the third preferred embodiment.

Thus, in the third embodiment, when a temperature difference (Tr'−Tam) between a refrigerant temperature detected by the refrigerant inlet temperature sensor 422 and the outside air temperature Tam detected by the outside air temperature sensor 423 is equal to or higher than 0° C. [i.e., (Tr'−Tam)≧0° C.] as shown in FIG. 8, as the temperature difference (Tr'−Tam) increases, the increasing ratio in the rotation speed of the compressor 1 is increased by the control unit 100. Further, in order to prevent heat from being radiated from the refrigerant in the air heat exchanger 4, the operation of the outdoor fan 41 attached onto the air heat exchanger 4 is stopped when (Tr'−Tam)≧0° C. Thereby, the cycle high pressure can be maintained in the heat pump cycle. Accordingly, it is possible to secure the hot-water supply ability, to maintain the hot-water supply temperature at the target hot-water supply temperature, and to prevent heat radiation loss in the air heat exchanger 4. Since there is no need to add functional components such as an electromagnetic valve, a control valve or an electric heater in the hot-water supply system, the reliability and durability will be improved.

Figure 9:
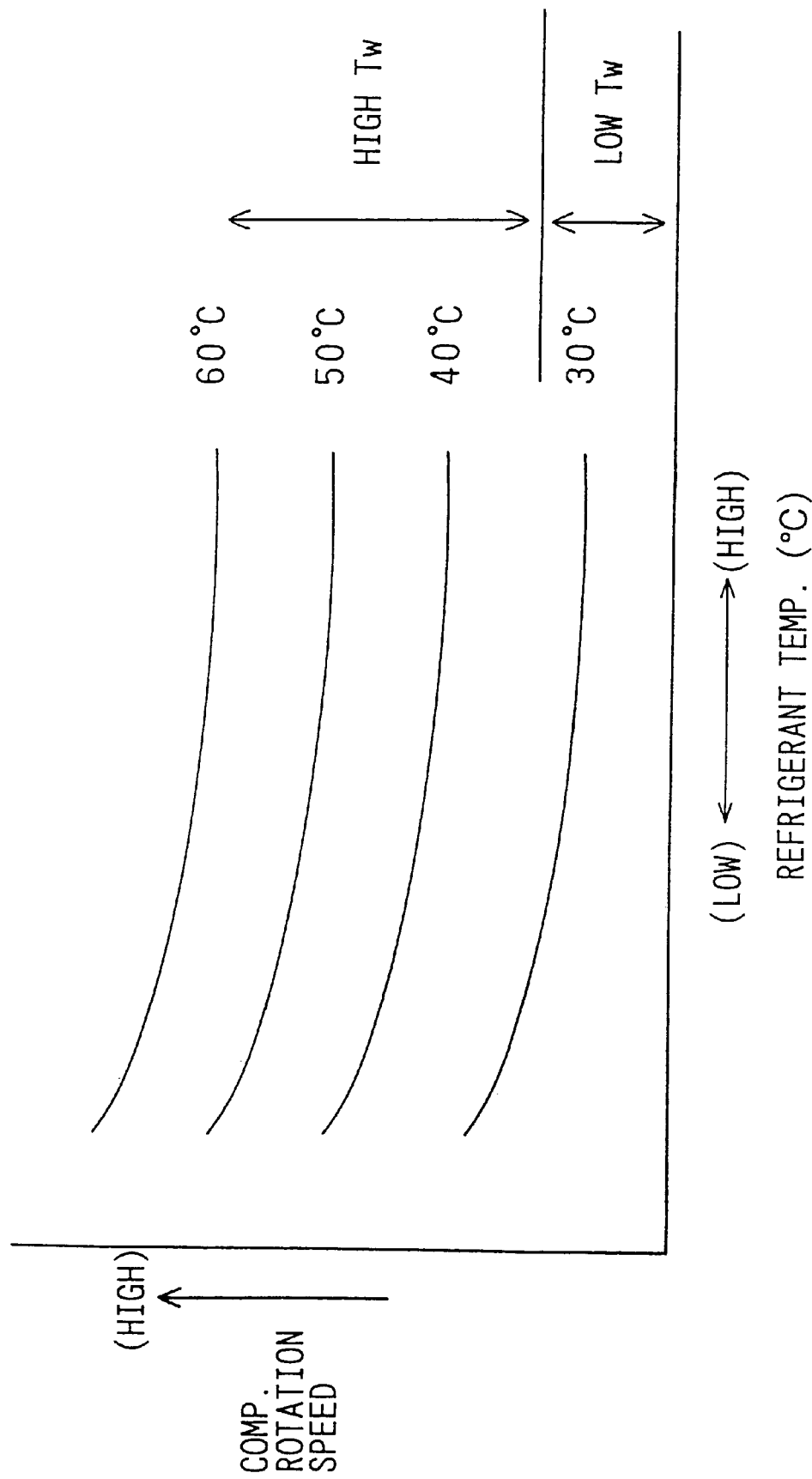
FIG. 9 is a graph for performing a compressor control based on a refrigerant temperature sucked into the compressor and a water temperature Tw, according to the third embodiment.

When the water temperature Tw becomes high, the hot-water supply ability decreases, and when the suction refrigerant temperature sucked into the compressor 1 is low, the load of the compressor 1 becomes relatively great. Accordingly, as shown in FIG. 9, the higher the hot-water temperature Tw is, or the lower the suction refrigerant temperature at the suction side of the compressor 1 is, the more the rotation speed of the compressor 1 is preferably increased. Thus, the cycle high pressure of the heat pump cycle can be maintained.

Figure 10:
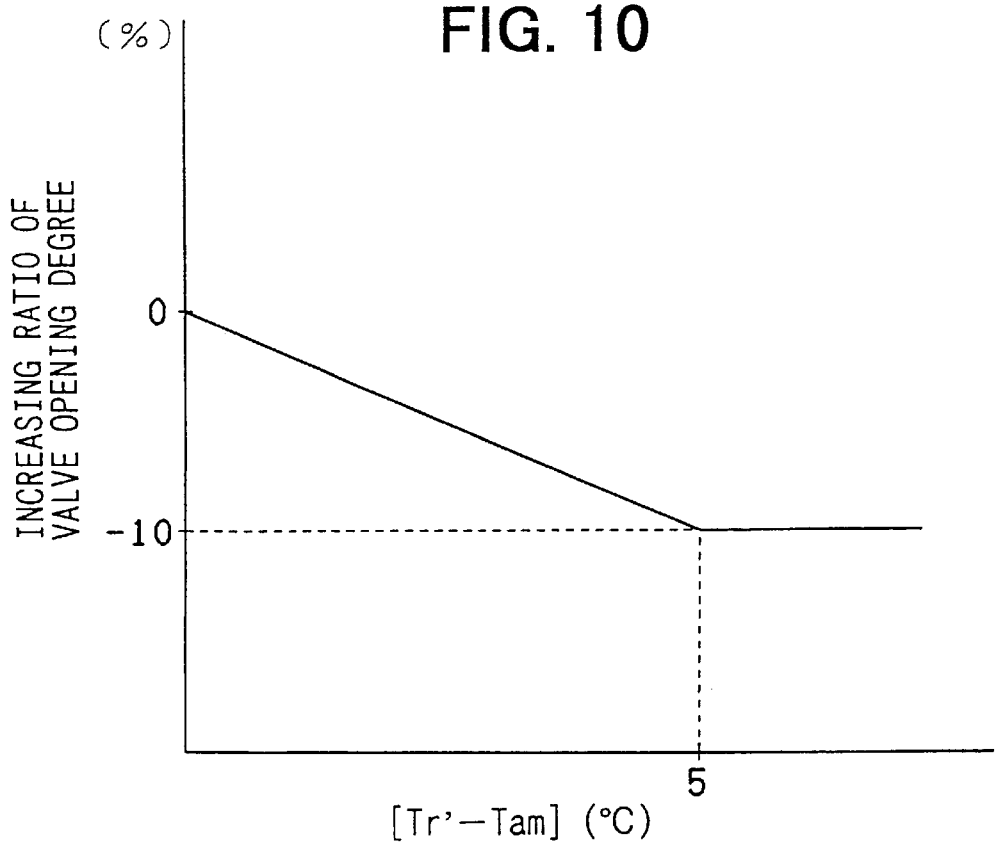
FIG. 10 is a graph for determining an increasing ratio of an opening degree of an expansion valve based on the temperature difference [Tr'–Tam], according to a fourth preferred embodiment of the present invention.

Next, with reference to FIG. 10, the description will be made of a fourth embodiment according to the present invention. In a hot-water supply system of the fourth embodiment, similarly the hot-water supply system of the first embodiment, the expansion valve 3 is controlled by an control unit 100 on the basis of the temperature difference $\Delta T$ shown in FIG. 2A when the water temperature is low. That is, the temperature difference $\Delta T$ is the temperature difference between the refrigerant outlet temperature Tr detected by the refrigerant temperature sensor 421 and the water temperature Tw detected by the water temperature sensor 511, and the opening degree of the expansion valve 3 is controlled in accordance with the temperature difference $\Delta T$.

If the operation is continued in a state in which the water temperature (Tw) is equal to or higher than a predetermined temperature (40° C.), the temperature difference $\Delta T$ becomes smaller so that the expansion valve 3 is controlled in the direction for increasing the opening degree of the expansion valve 3, and the refrigerant pressure within the heat pump cycle H becomes lower. When the cycle high pressure of the heat pump cycle lowers, as shown in FIG. 7, the cycle operation advances as follows: compressor compression (state 1→state 2), heat exchange (state 2→state 3) in the water heat exchanger 2, decompression (state 3→state 4) by the expansion valve 3, and heat radiation (state 4→state 1) in the air heat exchanger 4. Accordingly, as shown in FIG. 7, heat loss is caused.

Thus, in the fourth embodiment, when the temperature difference (Tr'−Tam) between the refrigerant temperature T' detected by the refrigerant inlet temperature sensor 422 and the outside air temperature Tam detected by the outside air temperature sensor 423 is equal to or larger than zero (i.e., (Tr'−Tam)≧0° C.), as the temperature difference (Tr'−Tam) becomes larger, an increasing ratio of the opening degree of the expansion valve 3 is decreased. Here, the increasing ratio of the opening degree of the expansion valve 3 corresponds to an increasing percentage (%) of the opening degree of the expansion valve 3 based on the temperature difference $\Delta T$. Further, when Tr'−Tam≧0° C., in order to prevent heat from being radiated in the air heat exchanger 4, the operation of the outdoor fan 41 attached onto the air heat exchanger 4 can be stopped.

According to the fourth embodiment, the cycle high pressure of the heat pump cycle can be maintained. Accordingly, it is possible to secure the hot-water supply ability, to maintain the hot-water supply temperature at the target hot-water supply temperature, and to prevent heat radiation loss in the air heat exchanger 4. Since there is no need to add functional components such as an electromagnetic valve, a check valve or an electric heater, the reliability and durability will be improved.

In the fourth embodiment, the control of the increasing ratio of the rotation speed of the compressor 1 according to the third embodiment, and the control of the increasing ratio of the opening degree of the expansion valve can be performed together.

Figure 11:
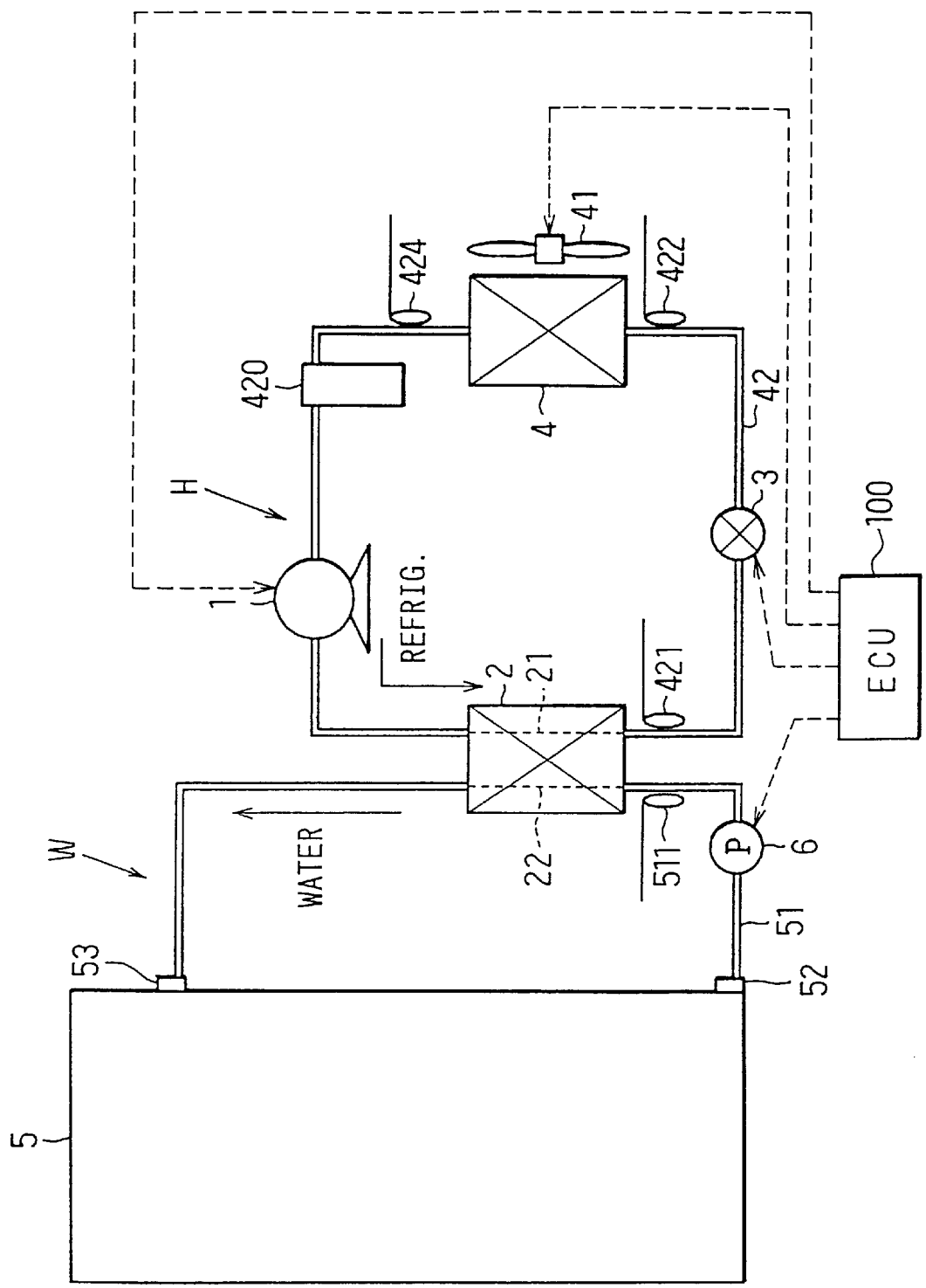
FIG. 11 is a schematic diagram showing a hot-water supply system with a heat pump cycle, according to a fifth preferred embodiment of the present invention.

Next, a fifth preferred embodiment of the present invention will be now described with reference to FIGS. 11–15. In the fifth embodiment, as shown in FIG. 11, an accumulator 420 is disposed in the refrigerant passage 42 at a refrigerant suction side of the compressor 1. Similarly to the first embodiment, the refrigerant temperature sensor 421 for detecting refrigerant temperature at the outlet side of the refrigerant flow passage 21, and the water temperature sensor 511 for detecting water temperature (hot-water temperature) at the inlet side of the hot-water flow passage 22 are disposed. Further, in refrigerant pipe 42 at the inlet side of the air heat exchanger 4, there is arranged a refrigerant inlet temperature sensor 422 for detecting temperature of refrigerant entering the air heat exchanger 4. In refrigerant pipe 42 at the outlet side of the air heat exchanger 4, there is arranged a refrigerant outlet temperature sensor 424 for detecting temperature of refrigerant flowing from the air heat exchanger 4.

Figures 12, 13:
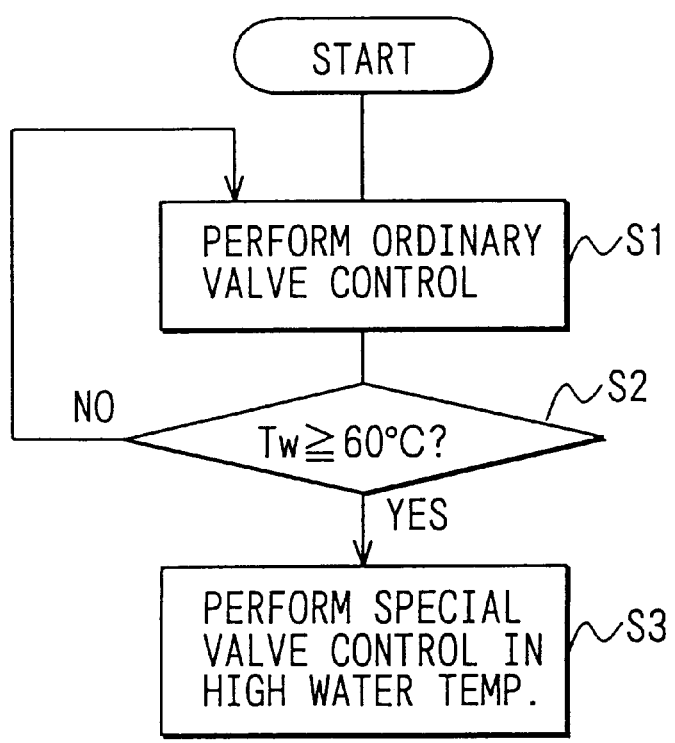
FIG. 12 is a view for explaining a control operation of an expansion valve in a low water temperature, according to the fifth embodiment.
FIG. 13 is a flow diagram showing a control operation of the expansion valve according to the fifth embodiment.

Operation of a hot-water supply system according to the fifth embodiment is described. In an ordinary operation of the hot-water supply system, an ordinary control of the opening degree of the expansion valve 3 is performed at step S1 of FIG. 13. That is, during the ordinary operation of the hot-water supply system, high-temperature high-pressure refrigerant compressed by the compressor 1 passes through the refrigerant flow passage 21, of the water heat exchanger 2 to heat water passing through the hot-water flow passage 22. The refrigerant, having passed through the refrigerant flow passage 21 of the water heat exchanger 2, is decompressed by the expansion valve 3, and is evaporated in the air heat exchanger 4 by absorbing heat from air. Refrigerant from the air heat exchanger 2 flows into the accumulator 420 to be separated into gas refrigerant and liquid refrigerant. Gas refrigerant separated in the accumulator 420 returns to the compressor 1. On the other hand, hot water within the hot-water storage tank 5 flows into the hot-water flow passage 22 from the hot-water outlet 52 at the lower part of the hot-water storage tank 5 through hot-water pipe 51 by the operation of the pump 6. After water is heated in the hot-water flow passage 22, heated hot water flows into the hot-water storage tank 5 from the hot-water inlet 53 provided at the upper part of the tank 5. Further, the expansion valve 3 is controlled by the control unit 100 so that the ordinary valve control is performed as shown in FIG. 12. That is, as shown in FIG. 12, the opening degree of the expansion valve 3 is controlled based on the temperature difference $\Delta T$ between the refrigerant temperature Tr detected by the refrigerant temperature sensor 421 and the water temperature Tw detected by the water temperature sensor 511, so that a suitable opening degree of the expansion valve 3 can be obtained and the COP of the heat pump cycle H can be improved.

In a high-water operation of the hot-water supply system, where the water temperature detected by the temperature sensor 511 is high (40° C. or higher, particularly 60° C. or higher), the hot-water supply ability becomes insufficient in the hot-water supply system. In the fifth embodiment, when the water temperature Tw is equal to or higher than a predetermined temperature (e.g., 60° C.) at step S2 in FIG. 13, a special valve control (i.e., high water temperature control) of the expansion valve 3 is performed at step S3.

Generally, the upper limit pressure (for example, 15 Mpa) in the heat pump cycle H, is set to a value lower than a compression resistance pressure (for example, 18 Mpa) of machinery and materials, such as the refrigerant pipe 42, constituting the heat pump cycle H. Further, in the high water temperature control, the target refrigerant pressure of the high-pressure side refrigerant pressure of the heat pump cycle H is set to the upper limit pressure. Thereby, it is possible to secure a hot-water supply ability which is necessary and sufficient for heating a supply water to the target hot-water supply temperature. However, when the high-pressure side refrigerant pressure of the heat pump cycle H is set to uniformly become the above-described upper limit pressure, temperature of hot-water after being heat-exchanged with the refrigerant in the water heat exchanger 2 may exceed the target hot-water supply temperature (for example, 90° C.). In this case, the ability of the pump 6 is controlled, that is, the flow amount of hot water is increased or decreased to maintain the temperature of hot-water from the water heat exchanger 2 at the target hot-water supply temperature. In order to maintain the high-pressure side refrigerant pressure of the heat pump cycle H at the target pressure, a high-pressure side refrigerant pressure sensor for detecting the high-pressure side refrigerant pressure is required. However, in this case, the cost will be increased.

Figure 14:
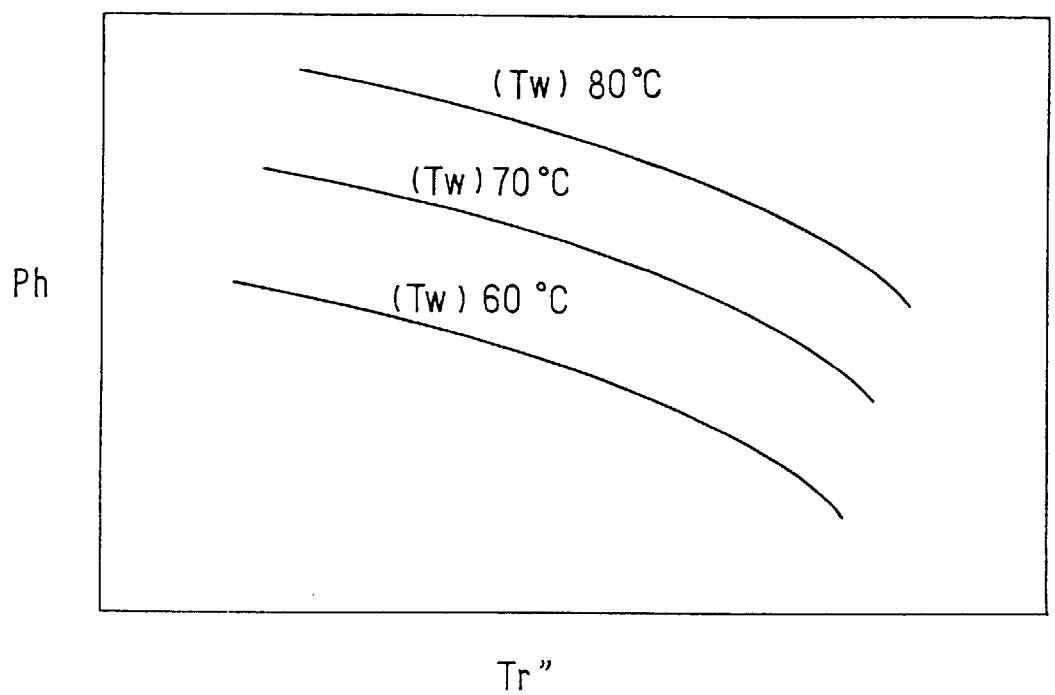
FIG. 14 is a graph showing a relationship between a refrigerant temperature Tr" flowing into an air heat exchanger and a high-pressure side refrigerant pressure Ph of a heat pump cycle in each water temperature Tw, according to the fifth embodiment.

In the fifth embodiment, a relationship between the temperature Tr" of the refrigerant entering the air heat exchanger 4 and the high-pressure side refrigerant pressure Ph is set in advance for each water temperature Tw as shown in FIG. 14, and the high-pressure side refrigerant pressure Ph is presumed from the water temperature Tw and the temperature Tr" of the refrigerant entering the air heat exchanger 4. Thereby, there is no need to provide a high-pressure side refrigerant pressure sensor, and therefore, a maintenance for the high-pressure side refrigerant pressure sensor is not required.

Figure 15:
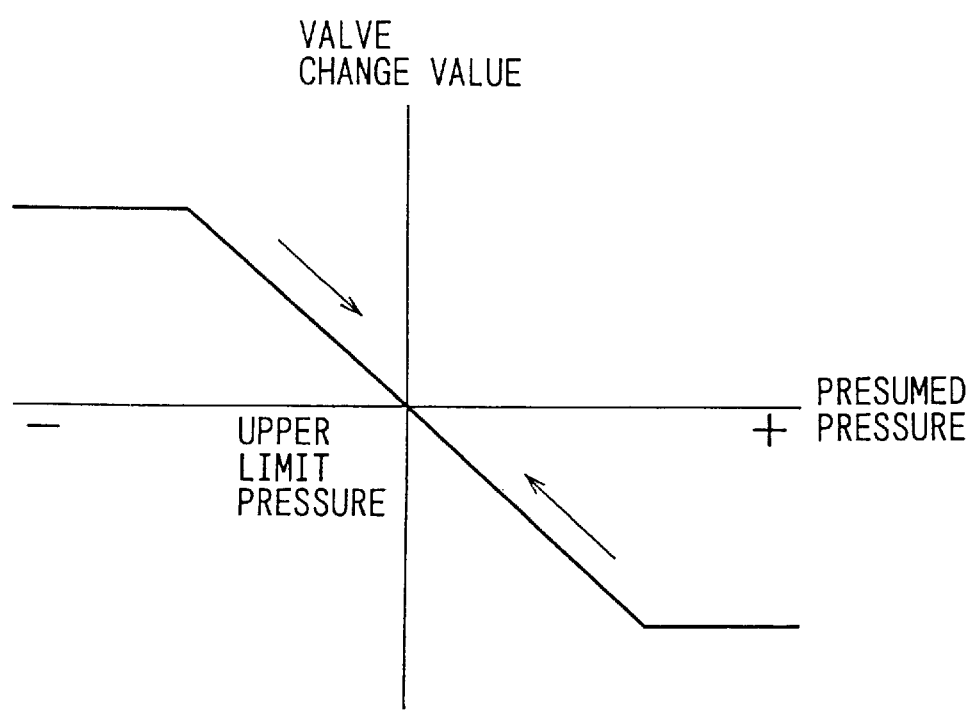
FIG. 15 is a graph for explaining a control of the expansion valve according to the fifth embodiment.

In the fifth embodiment, the opening degree of the expansion valve 3 is increased or decreased such that the present high-pressure side refrigerant pressure obtained by presuming through the use of the graph shown in FIG. 14 becomes the above-described upper limit pressure. As shown in FIG. 15, as a pressure difference between the upper limit pressure and the presumed high-pressure side refrigerant pressure is smaller, an increase in or a decrease value (change value) of the opening degree of the expansion valve 3 can be reduced. Thereby, it is possible to prevent hunting in the presumed pressure.

Figure 16:
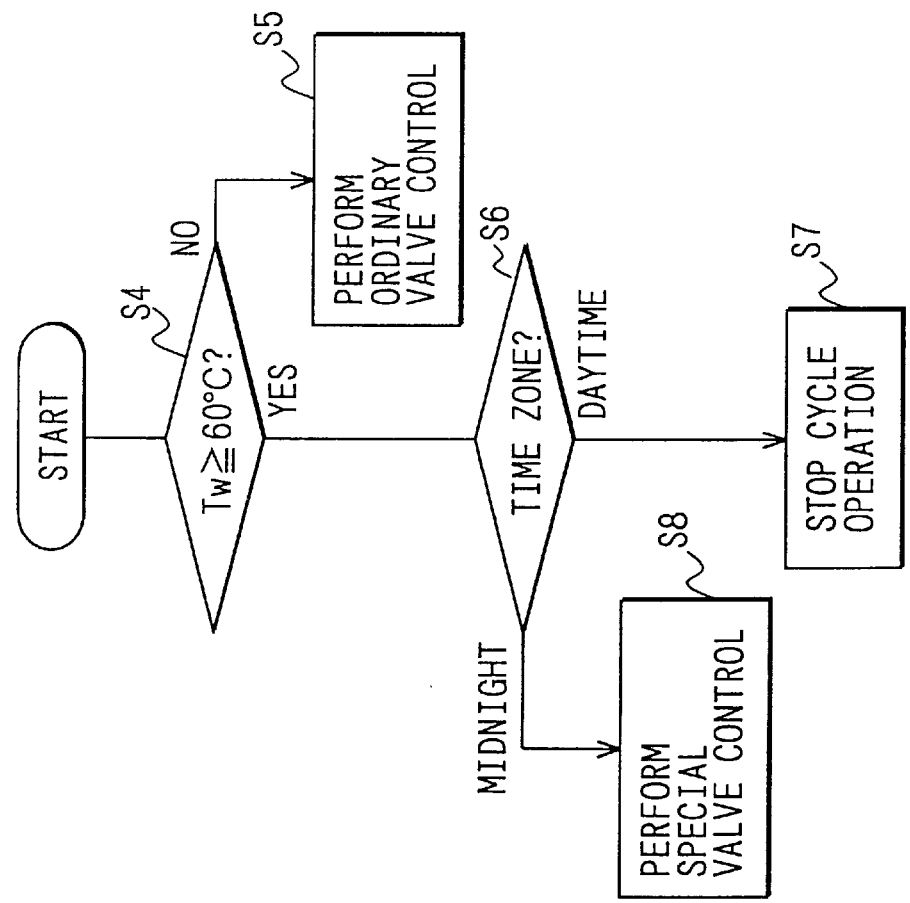
FIG. 16 is a flow diagram showing a control operation of a control unit of a hot-water supply system according to a sixth preferred embodiment of the present invention.

Next, a sixth preferred embodiment of the present invention will be now described with reference to FIG. 16.

When the entire hot-water within the hot-water storage tank 5 is boiled up to the target hot-water supply temperature, a hot-water layer already boiled up advances downwardly to press down a low-temperature water layer, which has not yet been boiled up, and therefore, the water temperature surely rises immediately before boiling up. When there is a hot-water lump, which remains unused within the hot-water storage tank 5, the hot-water lump may be supplied into the hot-water flow passage 22 of the water heat exchanger 2 so that the water temperature Tw is increased. In this case, in the above-described first through fifth embodiment, the high water temperature control (special valve control) is performed, whereby temperature of the supply hot-water can be raised up to the target hot-water supply temperature. However, the efficiency of the heat pump cycle during the special valve control is lower than during the ordinary valve control.

Accordingly, in the sixth embodiment, the high water temperature control (i.e., the special valve control) of the hot-water supply system is performed only in a midnight time zone, in which the electricity charge is cheap, but is not performed during any other time zones (such as daytime time zone) than that.

Specifically, when the water temperature Tw is equal to or higher than a predetermined temperature (for example, 60° C.) so that the high water temperature control is need, or when the high-pressure side refrigerant pressure lowers excessively or refrigerant heat is radiated in the air heat exchanger 4 while the ordinary control is performed for maintaining a temperature difference between the refrigerant outlet temperature and the water inlet temperature of the water heat exchanger 2 within the target temperature difference range, it is necessary to perform the high water temperature control (special valve control). For example, in the sixteenth embodiment, in the daytime time zone, the special valve control (high water temperature control) is not performed, and the cycle operation of the heat pump cycle H is stopped. That is, at step S4, it is determined whether or not the water temperature Tw flowing into the water heat exchanger 2 is equal to or higher than a predetermined temperature (e.g., 60° C.), for example. When the water temperature Tw is lower than 60° C., the ordinary valve control of step S5 is continuously performed. On the other hand, when the water temperature Tw is equal to or higher than 60° C., the time zone for which the hot-water supply system operates is determined at step S6. When it is in the daytime time zone, the operation of the heat pump cycle H is stopped at step S7. On the other hand, when it is in the midnight time zone, the special valve control is performed at step S8.

A seventh preferred embodiment according to the present invention will be now described with reference to FIG. 17. In a hot-water supply system according to the seventh embodiment, the condition for performing the special valve control (high water temperature control) is further restricted. For example, even when the water temperature becomes high and the special valve control is need to be performed, the special valve control is not performed night and day. Next, control operation of the hot-water supply system according to the seventh embodiment is described.

First, at step S9a, necessary heating value of hot-water per day is calculated from an amount of hot water to be daily used by the user and the temperature of hot water. Further, at step S9b, it is determined whether or not the user's use of hot water is affected even if the entire hot water within the hot-water storage tank 5 is not heated up to the target hot-water storage temperature, based on the necessary heating value of hot-water per day calculated at step S9a. In other words, it is determined whether or not the user's use of hot water is affected even if hot-water in a hot water-cold water boundary layer portion in the hot-water storage tank 5 is not heated up to the target hot-water storage temperature.

Specifically, at step S9b, when [Q1×T1<(Q2×T2+Q3×T3)], the special valve control (high water temperature control) immediately before boiling-up is not performed at step S9c. Here, Q1 is a hot-water amount to be daily used by the user, and T1 is the average temperature of the daily used hot water; Q2 is a hot-water storage amount within the hot-water storage tank 5 except for the hot-water boundary layer, and T2 is this hot-water storage temperature; and Q3 is a boundary layer capacity Q3 of hot water and T3 is the average temperature of the boundary layer hot water.

Figure 17:
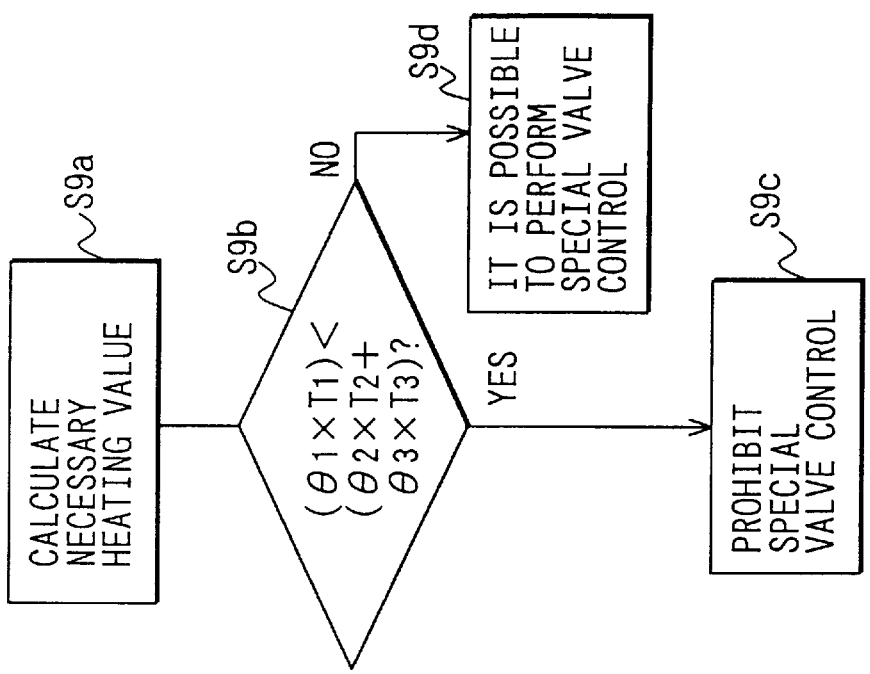
FIG. 17 is a flow diagram showing a control operation of a control unit of a hot-water supply system according to a seventh preferred embodiment of the present invention.

On the other hand, when it is not [Q1×T1<(Q2×T2+Q3×T3)], it is possible to perform the special valve control as indicated at step S9d in FIG. 17. Thereby, in the seventh embodiment, the running cost of the hot-water supply system can be reduced.

Figure 18:
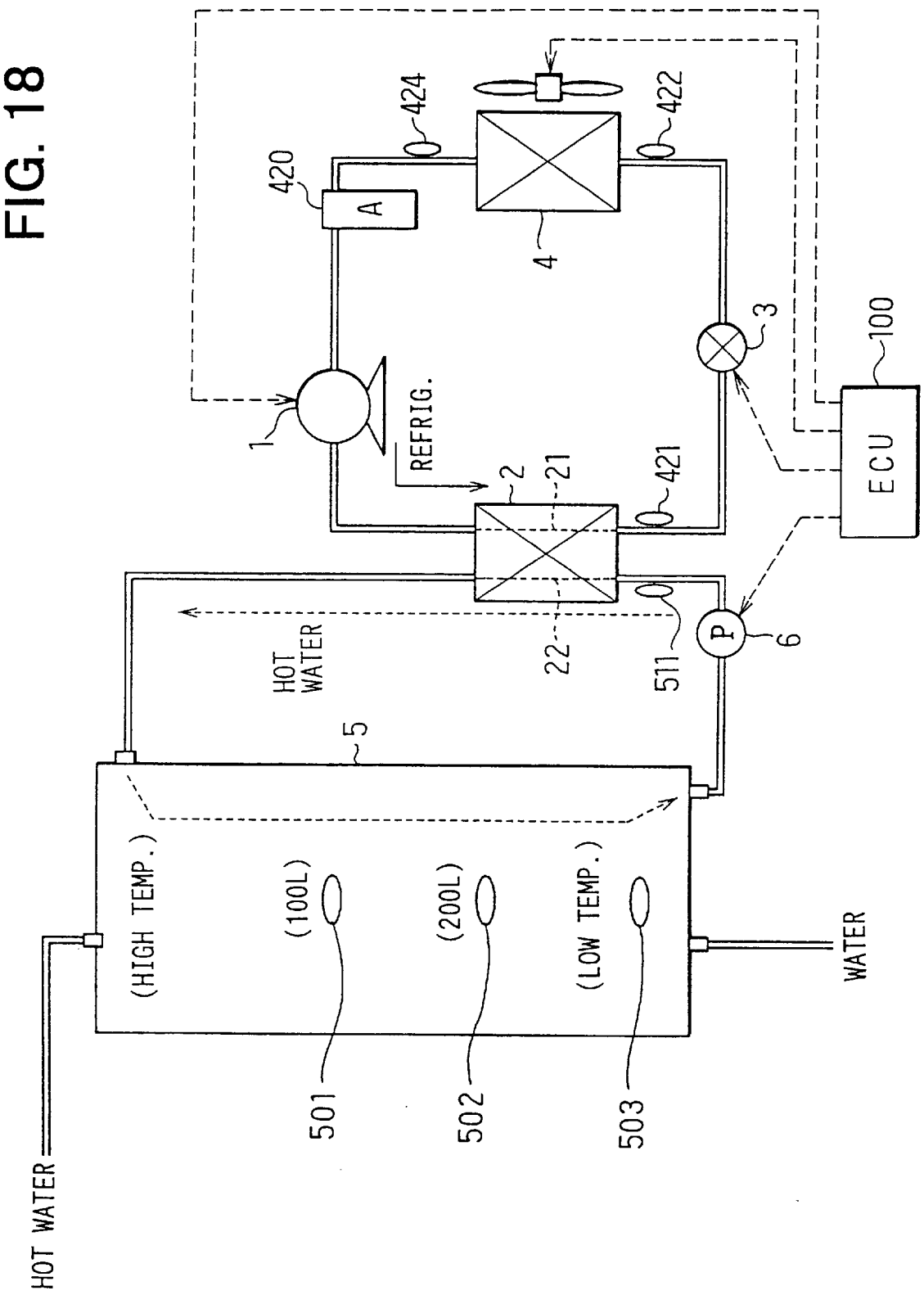
FIG. 18 is a schematic diagram showing a hot-water supply system with a heat pump cycle, according to an eighth preferred embodiment of the present invention.
Figure 19:
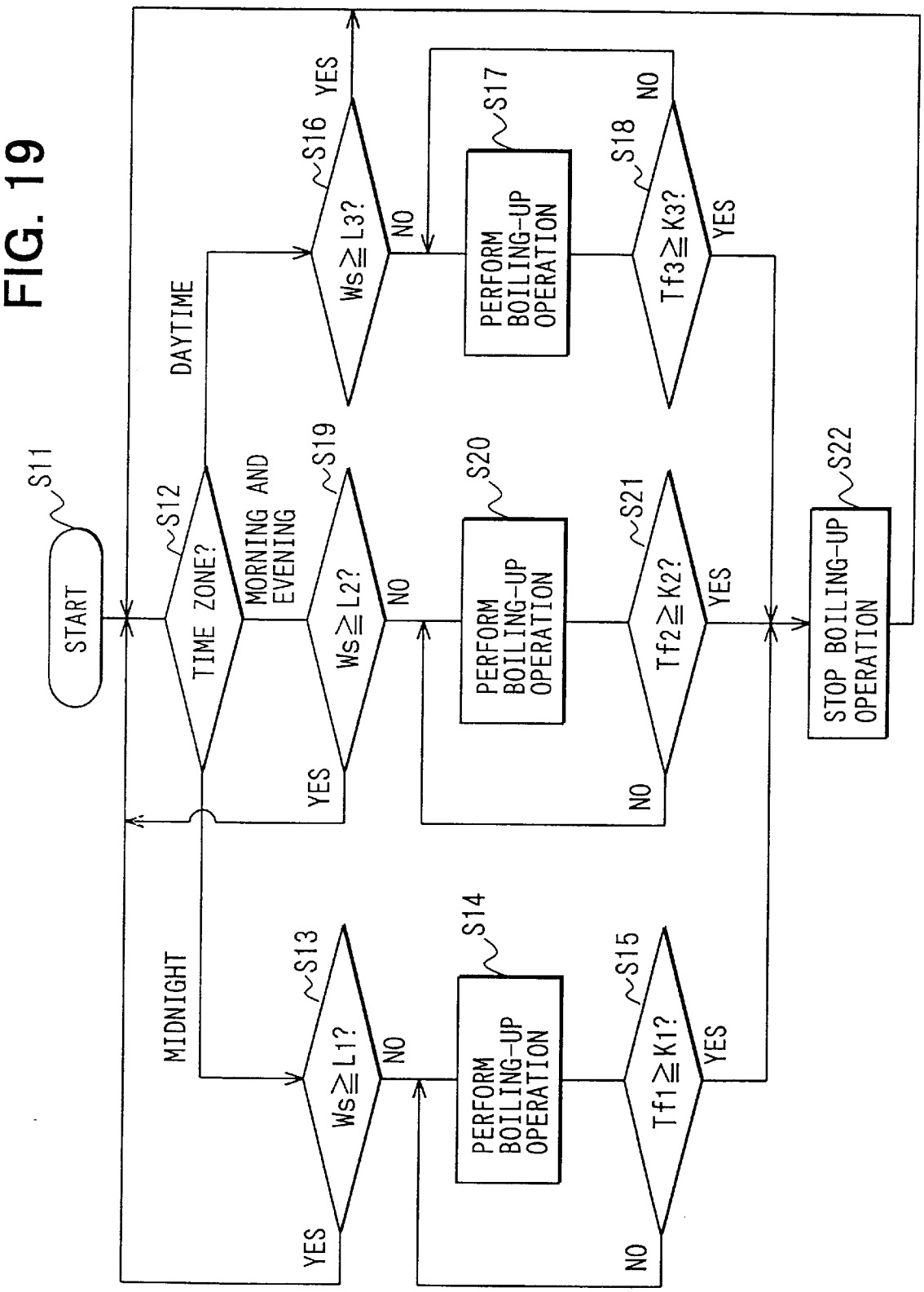
FIG. 19 is a flow diagram showing a control operation of a control unit of the hot-water supply system according to the eighth embodiment.

Next, an eighth preferred embodiment of the present invention will be described with reference to FIGS. 18 and 19. In a hot-water supply system of the eighth embodiment, as shown in FIG. 18, at distance positions of 100 liters, 200 liters and 300 liters from the top portion of the hot-water storage tank 5, there are disposed thermistors 501, 502 and 503 for detecting temperatures of the hot-water at the respective positions. The thermistors 501 and 502 function as a hot-water stored amount sensor, and the thermistor 503 functions as a filled-up tank sensor.

During boiling-up operation of the hot-water supply system, an operation, for storing hot-water obtained by heating low-temperature hot-water (or water) at the lower part of the tank 5 in the water heat exchanger 2, from the top portion of the hot-water storage tank 5, is performed. Therefore, temperature distribution of hot-water within the hot-water storage tank 5 during the boiling-up operation has a temperature relationship of a temperature Tf detected by the thermistor 503>a water temperature Tw detected by the water temperature sensor 511.

Next, the boiling-up operation of the hot-water supply system for each time zone will be described with reference to FIG. 19. In the eighth embodiment, on using the hot-water supply system, the user concludes an electricity contract, in which different electricity charges have been set for each time zone, with a power company. When an operating switch of the hot-water supply system is turned on at step S11, the present time zone is determined at step S12. In a midnight time zone (23:00 to 7:00), the control program moves to step S13, and in a daytime time zone (10:00 to 17:00), the control program moves to step S16, and in a case of the morning and evening time zone (7:00 to 10:00, 17:00 to 23:00), the control program moves to step S19.

When the midnight time zone is determined, at step S13, it is determined whether or not the amount Ws of stored hot-water exceeds a predetermined amount L1 (for example, 100 liters of hot-water at 60° C. or higher). When the amount Ws of stored hot-water is equal to or larger than the predetermined amount L1, the control program return to step S12 to stand by. On the other hand, when the amount Ws of the stored hot-water is smaller than the predetermined amount L1, the control program moves to step S14. In this respect, the present amount Ws of stored hot-water is calculated on the basis of the temperature of hot-water detected by the thermistor 501, 502 and 503. Specifically, when the thermistor 501 detects temperature of hot-water at 60° C. or higher, it will be assumed that there are 100 liters or more of hot-water at 60° C. or higher.

When the stored hot-water amount Ws is smaller than the predetermined amount L1, the boiling-up operation is started and performed at step S14, and the control program moves to the step S15. At step S15, it is determined whether or not temperature Tf1 of hot-water detected by the thermistor 503 (filled-up tank sensor) is equal to or larger than a first preset temperature K1 (boiling-up target temperature −10° C. in the eighth embodiment). When the temperature Tf1 of hot-water detected by the thermistor 503 is equal to or higher than the first preset temperature K1, the control program moves to Step S12. On the other hand, when temperature Tf1 of hot-water detected by the thermistor 503 is lower than the first preset temperature K1, the control program return to step S14 to continue the boiling-up operation.

In the daytime time zone of 10:00 to 17:00, at step S16, it is determined whether or not the present amount Ws of stored hot-water is equal to or larger than a predetermined amount L3 (for example, 300 liters of hot-water at 60° C. or higher). When the amount Ws of stored hot water is equal to or larger than the predetermined amount L3, the control program return to step S2 to stand by. On the other hand, when the amount Ws of stored hot water is smaller than the predetermined amount L3, the control program moves to step S17. The present amount Ts of stored hot-water is calculated on the basis of the temperature of hot-water detected by the thermistor 501, 502 and 503. Concretely, when the thermistor 502 detects temperature of hot-water at 60° C. or higher, it is assumed that there are 200 liters or more of hot-water at 60° C. or higher. At the step S17, the boiling-up operation is started and performed, and the control program moves to step S18.

At step S18, it is determined whether or not temperature Tf3 of hot-water detected by the thermistor 503 (filled-up tank sensor) is equal to or higher than a third preset temperature K3 (e.g., 50° C. in the eighth embodiment). When temperature Tf3 of hot-water is equal to or higher than the third preset temperature K3, the control program moves to Step S12. On the other hand, when the temperature Tw3 of hot-water is lower than the third preset temperature K3, the control program return to step S17 to continue the boiling-up operation.

In the morning and evening time zone of 7:00 to 10:00 and 17:00 to 23:00, it is determined whether or not the present amount Ws of stored hot-water is equal to or larger than a predetermined amount L2 (for example, 200 liters of hot-water at 60° C. or higher). When the amount Ws of stored hot water is equal to or larger than the predetermined amount L2, control program return to step S12 to stand by. On the other hand, when the amount Ws of stored hot water is smaller than the predetermined amount L2, the control program moves to step S20.

The present amount Ws of stored hot-water is calculated on the basis of hot-water temperature detected by the thermistor 501, 502 and 503. Concretely, when the thermistor 502 detects hot-water temperature at 60° C. or higher, it will be assumed that there are 200 liters or more of hot-water at 60° C. or higher. At step S20, the boiling-up operation is started and performed, and thereafter, the control program moves to step S21. At step S21, it is determined whether or not temperature Tf2 of hot-water detected by the thermistor 502 (filled-up tank sensor) is equal to or higher than a second preset temperature K2 (65° C. in the present embodiment). When the temperature Tf2 is equal to or higher than the second preset temperature K2, the control program moves to step S22, and the boiling-up operation is stopped at step S22. On the other hand, when the temperature Tf2 is lower than the second preset temperature K2, the control program returns to the step S20 to continue the boiling-up operation.

Advantages of the hot-water supply system according to the eighth embodiment will be described. The hot-water supply system is capable of independently determining a boiling-up start condition and a boiling-up terminate condition for each time zone correspondingly to a pattern to use the hot-water within the hot-water storage tank 5. Accordingly, electricity charges can be made cheap in a state in which no hot-water depletion is caused in all time zones. The boiling-up start condition and the boiling-up terminate condition may not be fixed values, but may be constructed such that the setting can be freely changed by the user or a service man. The hot-water supply system of the eighth embodiment may be constructed such that an optimum value for the boiling-up start condition or the boiling-up terminate condition is automatically set in accordance with the state of use of the hot-water by the user.

The termination of boiling-up operation may not be determined on the basis of temperature Tf1, Tf2, Tf3 of hot-water detected by the thermistor 501, 502, 503 (filled-up tank sensor), but be determined on the basis of water temperature Tw detected by the water temperature sensor 511 or heating value of hot-water within the hot-water storage tank 5.

That is, according to the eighth embodiment, in the midnight time zone in which the power rate has been set at the lowest, when the user uses the hot water within the tank 5 and a state is detected in which the heat storage amount Ws of hot water within the tank 5 is smaller than a first predetermined amount L1, the control unit 100 starts the boiling-up operation. On the other hand, when the hot water temperature Tw on the inlet side of the hot-water flow passage 22 is equal to or higher than the first preset temperature K1, or when the heat storage amount Ws (heat reserve amount) of hot water within the tank 5 becomes the amount of L1+α, the boiling-up operation is stopped. In this respect, $\alpha \geq 0$.

In the morning and evening time zone in which the power rate has been set comparatively low, when the user uses hot water within the tank 5 and a state is detected in which the heat storage amount Ws (heat reserve amount) of hot-water supply within the tank 5 is smaller than the second predetermined amount L2, the control unit 100 starts the boiling-up operation. On the other hand, when the hot water temperature on the inlet side of the hot-water flow passage exceeds the second preset temperature K2, or when the heat reserve amount Ws of hot water within the tank 5 reaches the amount L2+β, the boiling-up operation is stopped. In this respect, $\beta \geq 0$.

In the daytime time zone in which the power rate has been set high, when the user uses hot water within the tank 5 and a state is detected in which the heat reserve amount Ws of hot water within the tank 5 is smaller than the third predetermined amount L3, the control unit 100 starts the boiling-up operation. On the other hand, when the hot water temperature on the inlet side of the hot-water flow passage 22 exceeds the third preset temperature K3, or when the heat reserve amount Ws of hot water within the tank 5 reaches the amount K3+γ, the boiling-up operation is stopped. In this respect, $\gamma \geq 0$.

In the eighth embodiment, the boiling-up start condition is determined based on the predetermined water amounts L1, L2, L3, and the boiling-up finishing condition is determined based on the preset temperatures K1, K2, K3.

Figure 20:
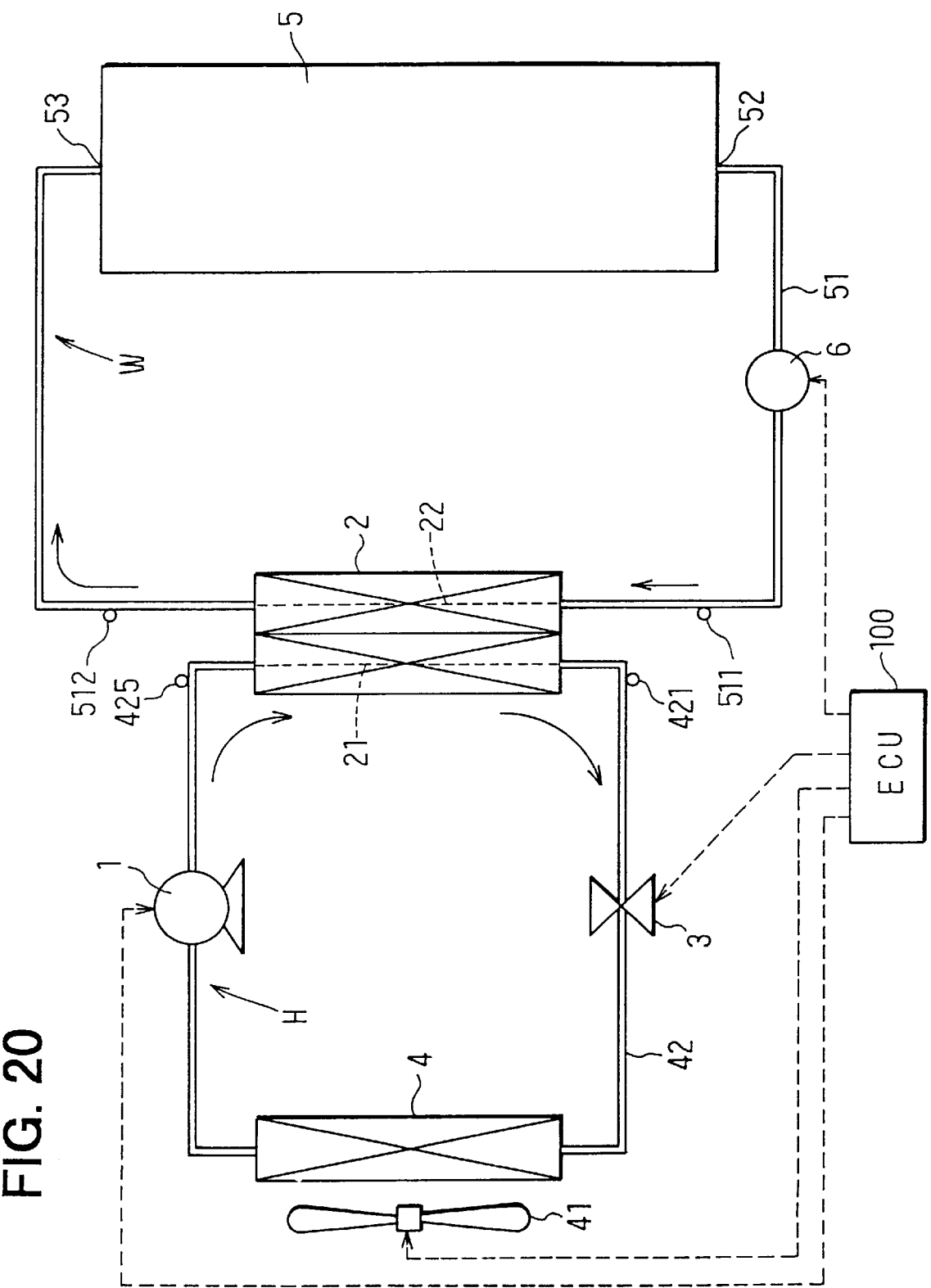
FIG. 20 is a schematic diagram showing a hot-water supply system with a heat pump cycle, according to a ninth preferred embodiment of the present invention.
Figure 21:
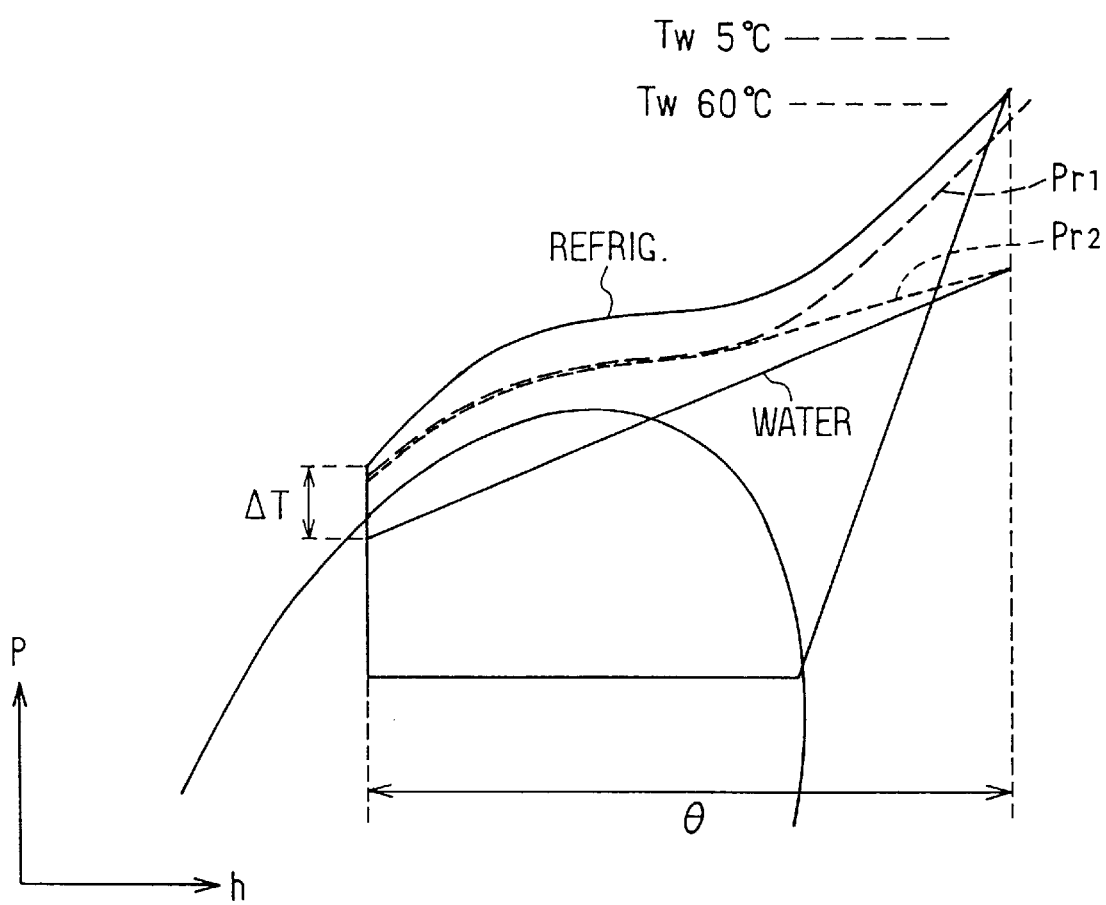
FIG. 21 is a p-h diagram (Mollier diagram) of the heat pump cycle when a water temperature in a hot water circuit is 5° C. and 60° C.
Figure 22:
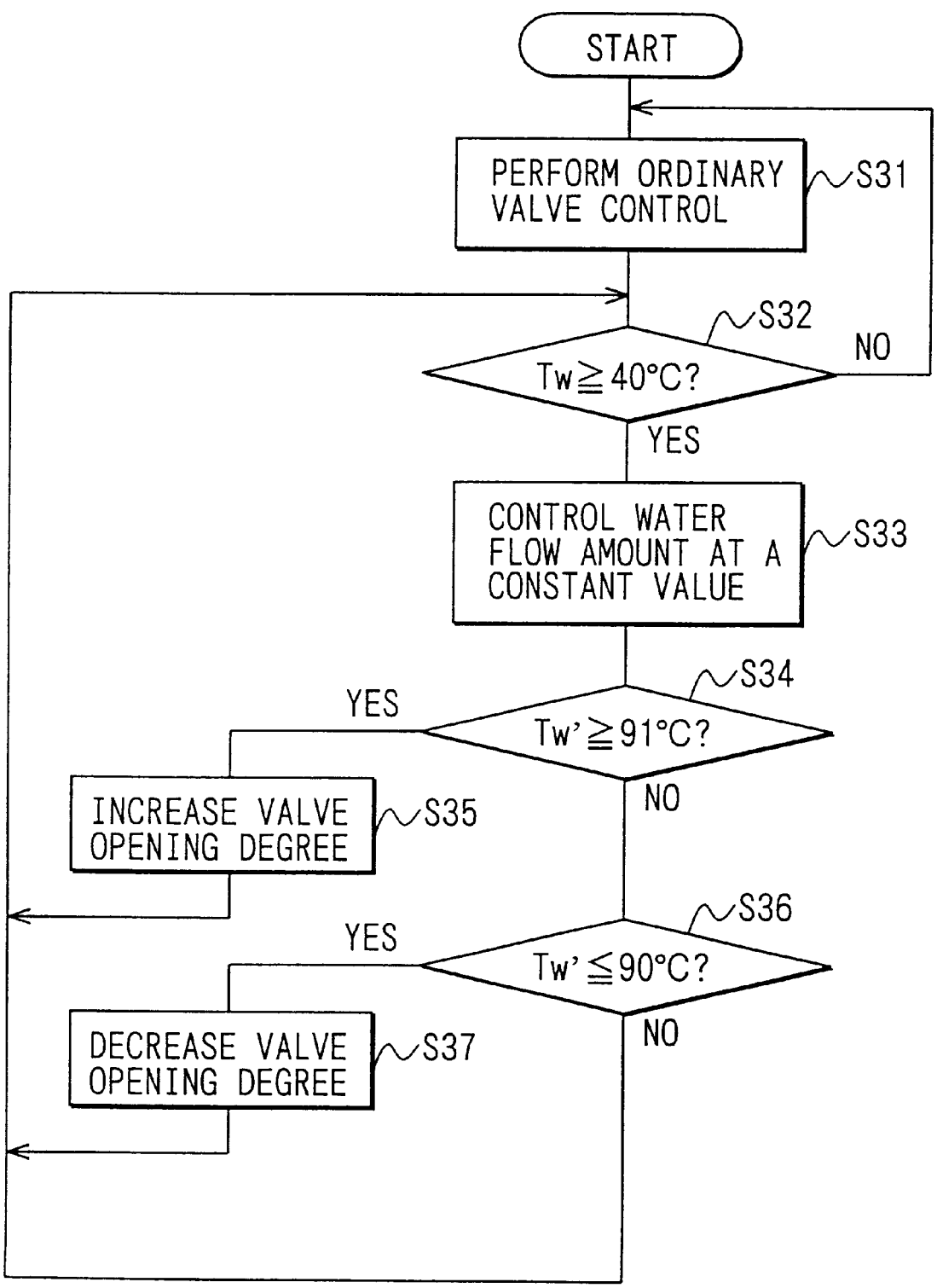
FIG. 22 is a flow diagram showing a control operation of a control unit of the hot-water supply system according to the ninth embodiment.

A ninth preferred embodiment of the present invention will be now described with reference to FIGS. 20–22. In a hot-water supply system of the ninth embodiment, as shown in FIG. 20, a water temperature sensor 512 for detecting temperature Tw' of hot water at the outlet side of the hot water passage 22 of the water heat exchanger 2 is disposed, as compared with the hot-water supply system of the above-described first embodiment. Accordingly, the control unit 100 controls the electrical power supplied to the electrical motor of the compressor 1, the electrical power supplied to the outdoor fan 41 and the opening degree of the expansion valve 3, based on output signals from the water temperature sensor 511, the reference temperature sensor 421 and the water temperature sensor 512.

When the water temperature detected by the water temperature sensor 511 is lower than a predetermined control change temperature (e.g., 40° C.), the opening degree of the expansion valve 3 is controlled by the control unit 100, so that a temperature difference ΔT between the reference temperature Tr detected by the reference temperature sensor 421 and the water temperature Tw detected by the water temperature sensor 511 is in a predetermined range of 9.5° C.–11.0° C. Further, the control unit 100 controls the electrical power supplied to the pump 6 to adjust the flow amount of hot water flowing through the hot water passage 22 of the water heat exchanger 2, so that the temperature of hot water flowing into the hot-water storage tank 5 becomes the target hot-water supply temperature.

Next, operation of the hot-water supply system according to the ninth embodiment will be now described with reference to FIG. 22. Water (hot water) in the hot-water storage tank 5 flows from the hot water outlet 52, and returns into the hot-water storage tank 5 from the hot water outlet 52 through the hot-water pipe 51 by the operation of the pump 6 after passing through the hot-water flow passage 22 of the water heat exchanger 2. On the other hand, refrigerant compressed at high temperature and high pressure by the compressor 1 flows through the refrigerant flow passage 21 of the water heat exchanger 2 to heat water (hot-water) flowing through the hot-water flow passage 22 of the water heat exchanger 2 in the opposite direction. While refrigerant passes through the expansion valve 3, the refrigerant expands to become at low pressure. The low-temperature refrigerant from the expansion valve 3 heat-exchanges with outside air blown by the outdoor fan 41 within the air heat exchanger 4 to be evaporated, and returns to the compressor 1 after passing through the accumulator (not shown). In the ordinary valve control where the water temperature Tw flowing into the water heat exchanger 2 is low, the expansion valve 3 is controlled by the control unit 100 on the basis of the temperature difference ΔT between refrigerant outlet temperature Tr detected by the refrigerant temperature sensor 421 and the water inlet temperature Tw detected by the water temperature sensor 511.

That is, at step S31, ordinary valve control of the valve opening degree of the expansion valve 3 is performed so that this temperature difference ΔT is within a target temperature difference range (for example, 9° C.–11° C.). Specifically, in the ordinary valve control at step S31, when the temperature difference ΔT is smaller than 9° C., the expansion valve 3 is operated in a direction that opens the valve. On the other hand, when the temperature difference ΔT is larger than 11° C., the expansion valve 3 is operated in a direction that closes the valve.

When the above-described control is performed in a state in which the water temperature Tw is high (40° C. or higher), the temperature difference ΔT between the refrigerant temperature Tr on the outlet side of the refrigerant flow passage 21 and the water temperature Tw detected by the water temperature sensor 511 becomes smaller, so that the expansion valve 3 is controlled in the direction for opening the expansion valve 3. Thereby, high-pressure side refrigerant pressure within the heat pump cycle H decreases, and the hot-water supply ability is decreased. As a result, there is cause a disadvantage that the hot-water supply temperature becomes unable to be maintained at the target hot-water supply temperature. For example, as shown in FIG. 21, Pr1 indicates a P-H diagram when the water temperature Tw is 5° C., and Pr2 indicates a P-H diagram when the water temperature Tw is 60° C.

Accordingly, at step S32, it is determined whether or not the water temperature Tw is equal to or higher than a predetermined temperature (e.g., 40° C.). When the water temperature Tw is lower than the predetermined temperature (40° C.), control program returns to step S31, and the ordinary valve control is performed until the water temperature Tw becomes equal to or higher than the predetermined temperature (40° C.).

When the water temperature Tw is equal to or higher than the predetermined temperature (4° C.), the electrical current amount applied to the pump 6 is made constant so that the flow amount of hot water flowing through the hot water circuit W is fixed to a constant value, at step S33. Next, at step S34, it is determined whether the water temperature Tw becomes equal to or higher than 91° C. When Tw≧91° C. at step S34, the valve opening degree of the expansion valve 3 is increased at step S35. On the other hand, when Tw<91° C. at step S34, it is determined whether or not the water temperature Tw is equal to or lower than 90° C. When Tw≦90° C. at step S36, the valve opening degree of the expansion valve 3 is decreased, and thereafter the control program returns to step S32. On the other hand, when Tw>90° C. at step S36, the control program directly returns to step S32.

According to the present invention, when the water temperature Tw is equal to or higher than the predetermined temperature (e.g., 40° C.), the high water temperature control (special control at step S33–S37) is performed. Therefore, even when the hot-water supply system is in the state immediately before the boiling-up, the refrigerant pressure of the heat pump cycle H can be maintained at a high pressure. Accordingly, a necessary hot water supply amount can be obtained without reducing the water heating capacity, and the water temperature to be supplied can be maintained at the target hot-water supply temperature.

Figure 23:
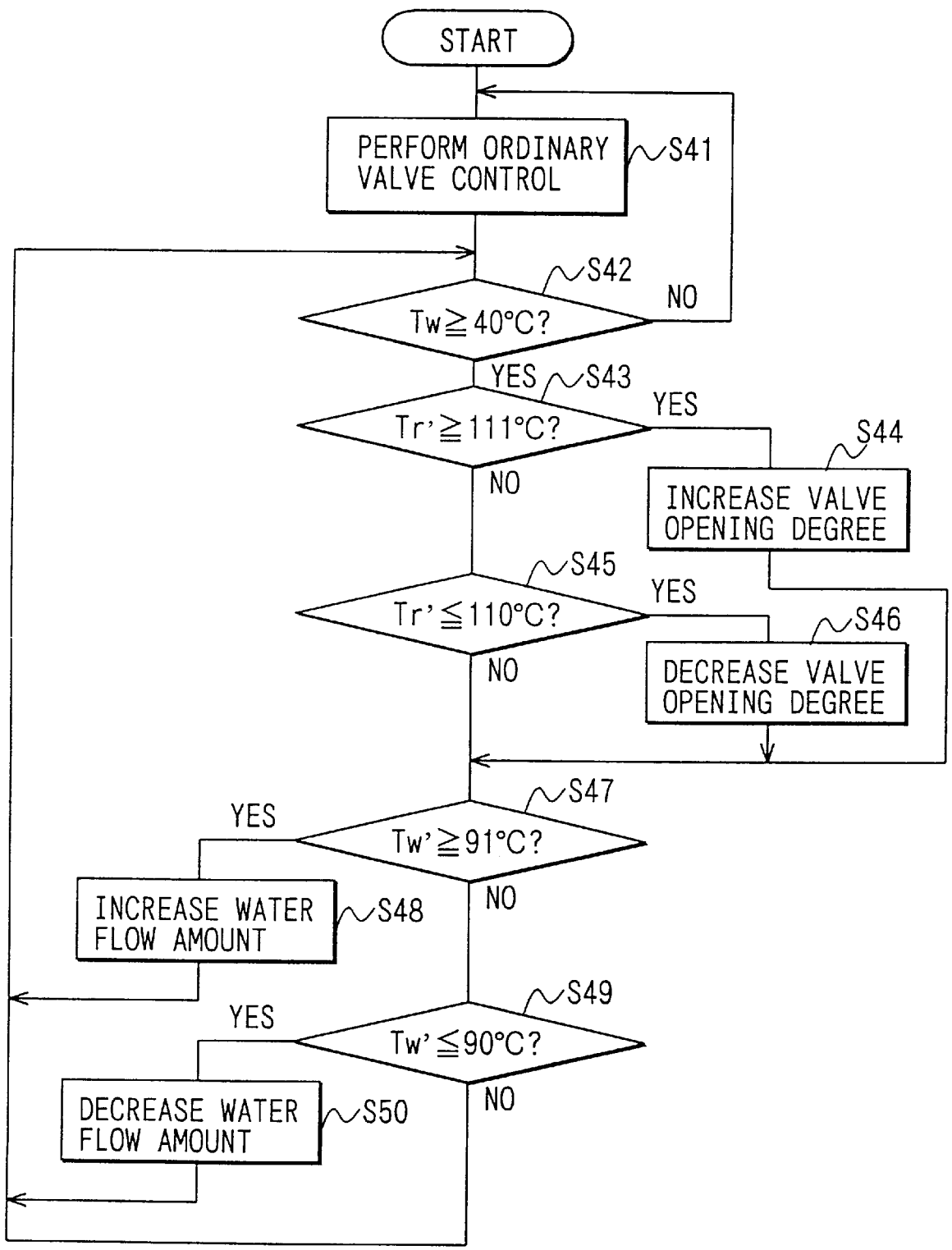
FIG. 23 is a flow diagram showing a control operation of a control unit of a hot-water supply system according to a tenth preferred embodiment of the present invention.

A tenth preferred embodiment of the present invention will be now described with reference to FIG. 23. In the tenth embodiment, the structure of a hot-water supply system is similar to that of the above-described ninth embodiment. However, the control operation of the control unit 100 is different from that of the above-described ninth embodiment. Here, operation of the hot-water supply system according to the tenth embodiment will be now described with reference to FIG. 23. First, at step S41, ordinary valve control of the valve opening degree of the expansion valve 3 is performed so that the temperature difference ΔT is within a target temperature difference range (for example, 9.5° C.–11° C.). Specifically, in the ordinary valve control at step S31, when the temperature difference ΔT is smaller than 9.5° C., the expansion valve 3 is operated in a direction that opens the valve. On the other hand, when the temperature difference ΔT is larger than 11° C., the expansion valve 3 is operated in a direction that closes the valve. Next, at step S42, it is determined whether or not the water temperature Tw is equal to or higher than a predetermined temperature (e.g., 40° C.). When the water temperature Tw is lower than the predetermined temperature (40° C.), control program returns to step S41, and the ordinary valve control is performed until the water temperature Tw becomes equal to or higher than the predetermined temperature (40° C.).

When the water temperature Tw is equal to or higher than the predetermined temperature (40° C.), the high water temperature control (special control) is performed at steps S43–S50. That is, at step S43, it is determined whether the refrigerant temperature Tr' detected by the refrigerant temperature sensor 425 is equal to or higher than 111° C. When Tr'≧111° C. at step S43, the valve opening degree of the expansion valve 3 is increased at step S44. On the other hand, when Tr'<111° C. at step S43, it is determined whether or not the refrigerant temperature Tr' is equal to or lower than 110° C. at step S45. When Tr'≦110° C. at step S45, the valve opening degree of the expansion valve 3 is decreased, and thereafter the control program moves to step S47. On the other hand, when Tr'>110° C., it is determined whether or not the hot-water supply temperature Tw' detected by the hot-water temperature sensor 512 becomes equal to or higher than 91° C. at step S47. When Tw'≧91° C. at step S47, the electrical current applied to the pump 6 is increased so that the flow amount of hot water circulating in the hot water circuit W is increased at step S48. On the other hand, when Tw'<91° C. at step S47, it is determined whether or not the hot-water supply temperature Tw' is equal to or lower than 90° C. at step S49 When Tw'≦90° C. at step S49, the flow amount of hot water circulating in the hot water circuit W is decreased at step S50, and thereafter the control program returns to step S42. On the other hand, when Tw'>90° C. at step S49, the control program directly returns to step S42.

According to the tenth embodiment of the present invention, when the water temperature Tw is equal to or higher than the predetermined temperature (e.g., 40° C.), the high water temperature control (special control at step S43–S50) is performed. Therefore, even when the hot-water supply system is in the state immediately before the boiling-up, the refrigerant pressure of the heat pump cycle H can be maintained at a high pressure. Accordingly, a necessary hot water supply amount can be obtained without reducing the water heating capacity, and the hot-water temperature to be supplied can be maintained at the target hot water supply temperature.

Although the present invention has been fully described in connection with the preferred embodiments thereof with reference to the accompanying drawings, it is to be noted that various changes and modifications will become apparent to those skilled in the art.

For example, in the hot-water supply system having the structure of FIG. 1, when the water temperature Tw is high (40° C. or higher), the control unit 100 may perform the following control, to maintain the cycle high pressure of the refrigerant in the heat pump cycle H. That is, when a sensor for detecting refrigerant pressure discharged from the compressor 1 is provided, and when the detected refrigerant pressure is lower than a refrigerant pressure corresponding to the target hot-water supply temperature, the opening degree of the expansion valve 3 is controlled by the control unit 100 to be reduced (in the direction to close) so as to reduce the pressure difference. Alternatively, when a sensor for detecting the refrigerant pressure discharged from the compressor 1 is provided, and when the detected refrigerant pressure is lower than the refrigerant pressure corresponding to the target hot-water supply temperature, control for increasing the rotation speed of the compressor 1 is performed so as to reduce the pressure difference. In the above-described embodiments, the control of the expansion valve 3 and the control of the compressor 1 may be combined and executed at the same time.

In each of the above-described embodiments, the hot-water stored in the hot-water storage tank 5 is utilized as a hot-water supply or a hot-water for a bath, but can be utilized for a floor heating, an indoor heating and the like. In addition, water within an another hot-water circuit can be heated using the hot water through a heat exchanger.

Figure 24:
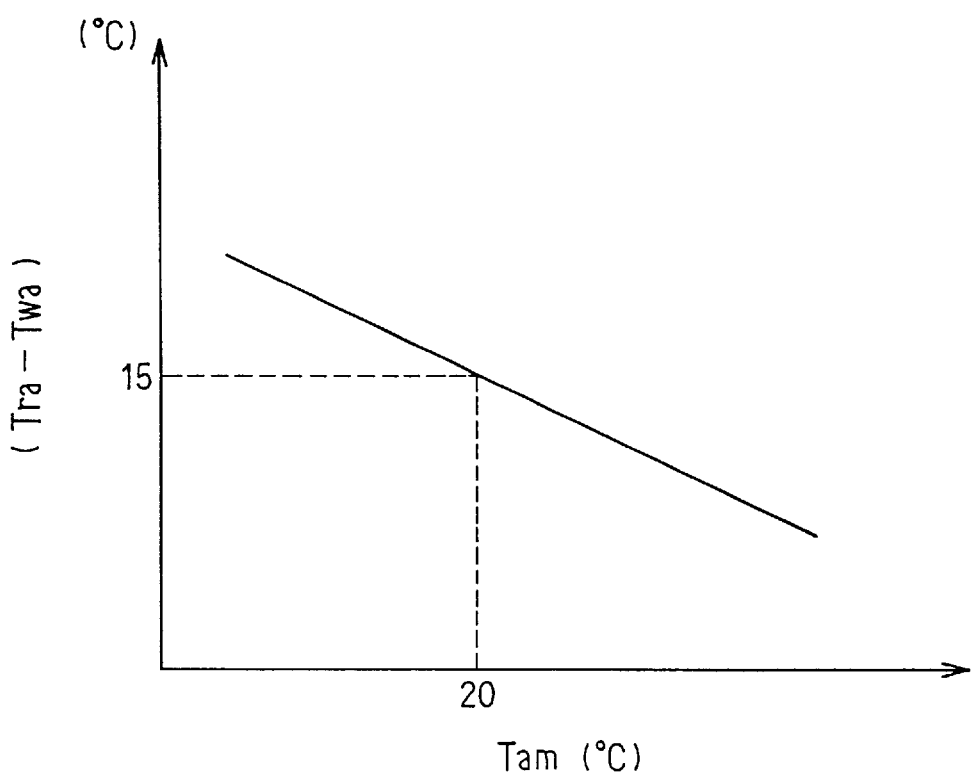
FIG. 24 is a graph showing a relationship between the outside air temperature Tam, and a temperature difference (Tra–Twa) between a target refrigerant temperature Tra discharged from a compressor and a target hot-water supply temperature Twa, according to a modification of the present invention.
Figure 25:
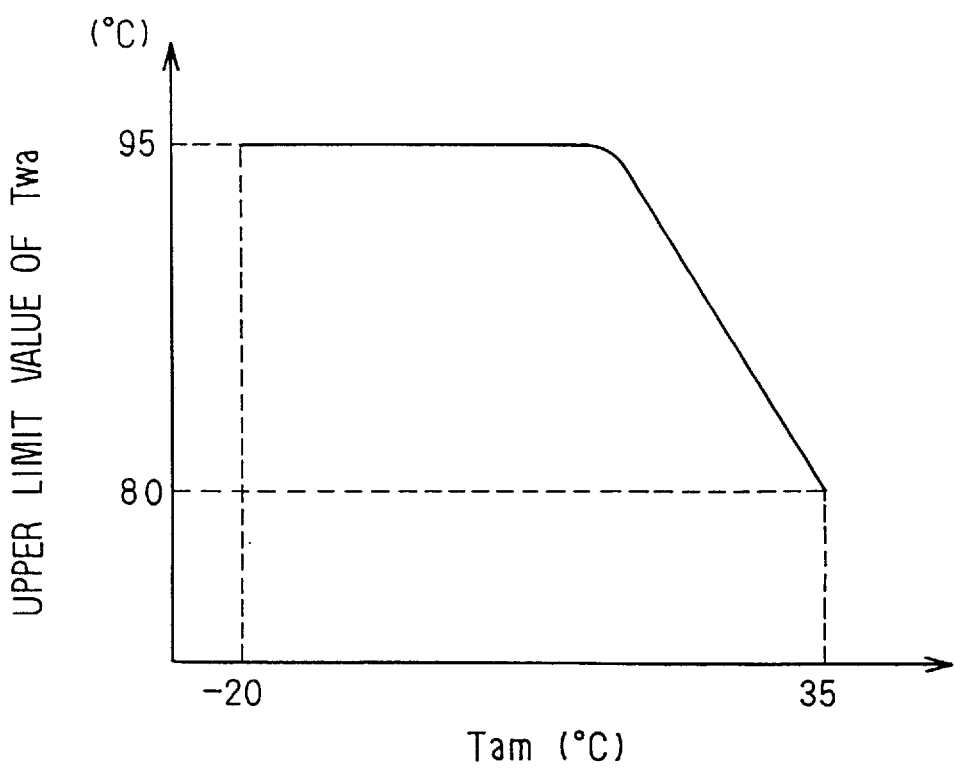
FIG. 25 is a graph showing a relationship between the outside air temperature Tam and an upper limit value of the target hot-water supply temperature Twa, according to an another modification of the present invention.

The control unit 100 can set a target refrigerant temperature Tra discharged from the compressor 1 and the target hot-water supply temperature Twa so that a temperature difference (Tra−Twa) between the target refrigerant temperature Tra and the target hot-water supply temperature Twa becomes smaller as the outside air temperature Tam becomes higher, as shown in FIG. 24. Further, as shown in FIG. 25, an upper limit value of the target hot-water supply temperature Twa can be made lower as the outside air temperature Tam becomes higher.

Figure 26:
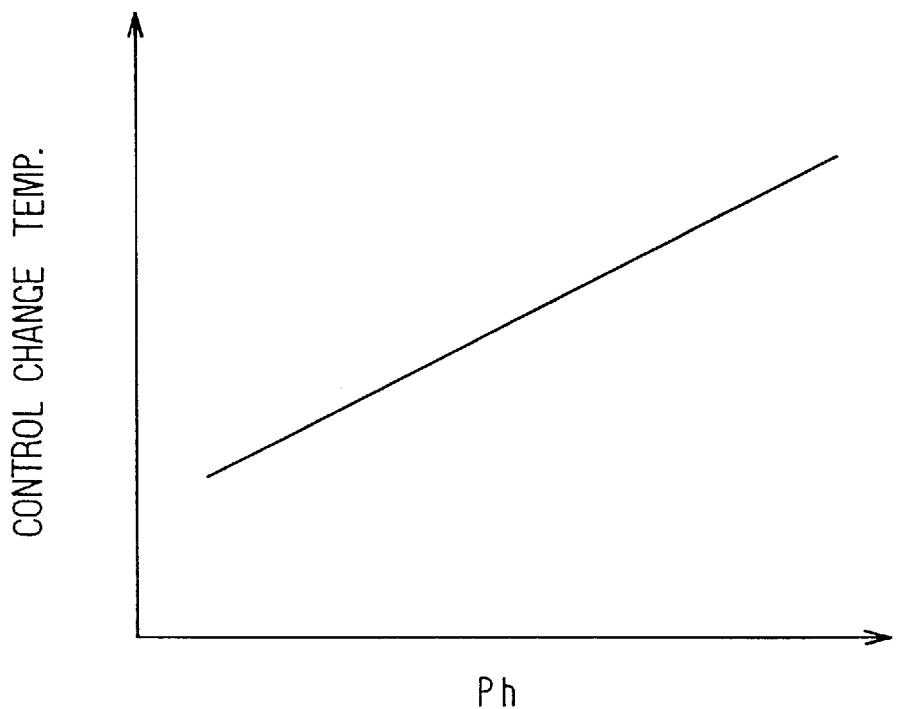
FIG. 26 is a graph showing a relationship between a high-pressure side refrigerant pressure Ph of a heat pump cycle and a control change temperature, according to a further another modification of the present invention.

In the hot-water supply system according to the ninth or tenth embodiment, as the high-pressure side refrigerant pressure Ph of the heat pump cycle H becomes lower, it is difficult to perform a control due to the temperature difference ΔT between the refrigerant outlet temperature Tr detected by the refrigerant temperature sensor 421 and the water inlet temperature Tw detected by the water temperature sensor 511. Further, the temperature difference ΔT is compared with the predetermined temperature 40° C. (control change temperature), and the operation of the heat pump cycle H is controlled. However, the control change temperature can be set to be changed. That is, as shown in FIG. 26, as the high-pressure side refrigerant pressure Ph of the heat pump cycle H is lower, the control change temperature can be set to be lower.

Figure 27:
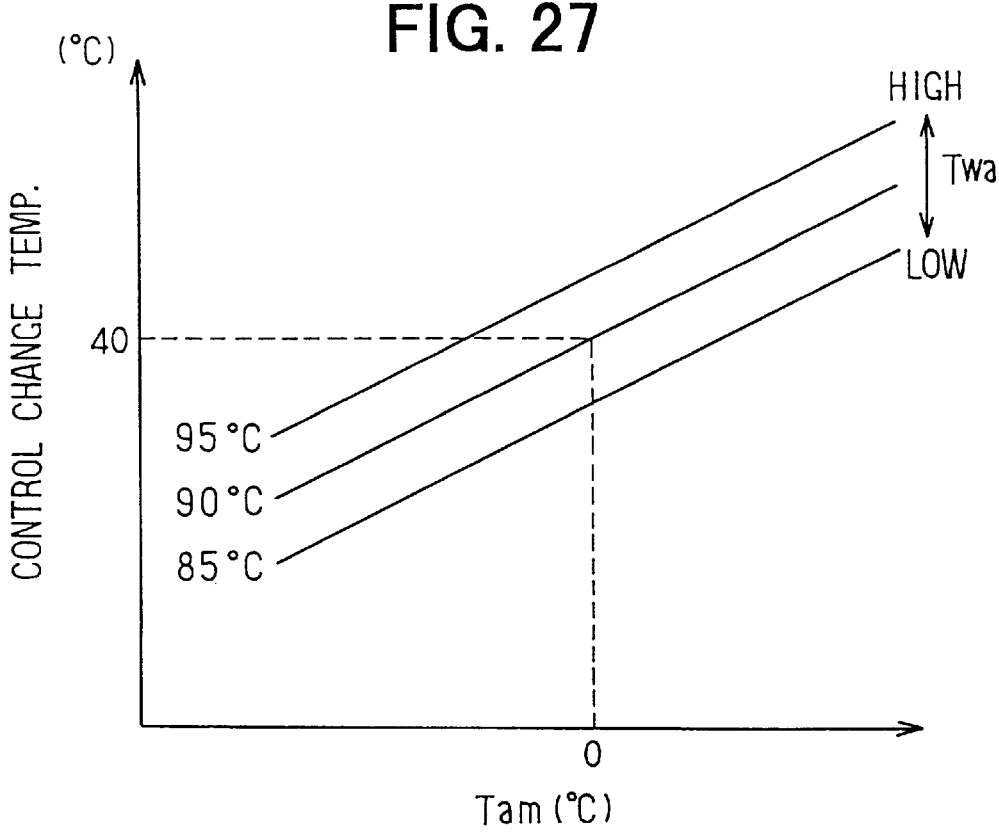
FIG. 27 is a graph showing a relationship between the outside air temperature Tam, the target hot-water supply temperature Twa and the control change temperature, according to a further another modification of the present invention.

In addition, as the outside air temperature Tam or the target hot-water supply temperature Twa is lower, it is difficult to perform the control due to the temperature difference ΔT. Accordingly, as shown in FIG. 27, as the outside air temperature Tam or the target hot-water temperature Twa is lower, the control change temperature can be set to be lower.

In the above-described embodiments, as a refrigerant temperature sucked into the compressor 1 becomes lower, the control unit 100 may control the expansion valve 3 in the direction reducing the valve opening degree so that the high-pressure side refrigerant pressure of the heat pump cycle H becomes equal to or higher than a predetermined refrigerant pressure. Alternatively, as a refrigerant temperature sucked to the compressor becomes lower, the control unit may control the rotation speed of the compressor to be increased so that the high-pressure side refrigerant pressure of the heat pump cycle becomes equal to or higher than the predetermined refrigerant pressure.

Such changes and modifications are to be understood as being within the scope of the present invention as defined by the appended claims.

What is claimed is:

1. A hot-water supply system comprising:
a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;
a fluid circuit having therein a tank for storing the fluid for a supply, and a pump for flowing the fluid in the fluid circuit, the tank being connected to the fluid passage of the fluid heat exchanger; and
a control unit for controlling a temperature of the fluid to be supplied to a target fluid temperature; wherein:

the control unit controls the operation of the expansion valve in a first direction increasing an opening degree of the expansion valve, when a temperature difference, between a refrigerant temperature at an outlet side of the refrigerant passage in the fluid heat exchanger and a fluid temperature at an inlet side of the fluid passage in the fluid heat exchanger, is smaller than a target temperature difference;

the control unit controls operation of the expansion valve in a second direction decreasing the opening degree of the expansion valve, when the temperature difference is larger than the target temperature difference; and when the temperature difference is smaller than the target temperature difference and the expansion valve is controlled in the first direction, the control unit maintains a high-pressure side refrigerant pressure before being decompressed in the heat pump cycle to be higher than a predetermined refrigerant pressure to achieve the target fluid temperature.

2. The hot-water supply system according to claim 1, wherein:
when the expansion valve is controlled in the first direction, the control unit sets an upper limit opening degree of the expansion valve, for obtaining a refrigerant pressure corresponding to the target fluid temperature, and controls the expansion valve in an opening degree range lower than the upper limit opening degree.

3. The hot-water supply system according to claim 1, wherein:
when an actual refrigerant pressure becomes smaller than a refrigerant pressure corresponding to the target fluid temperature after the expansion valve is controlled in the first direction, the control unit controls the expansion valve in the second direction so that the high-pressure side refrigerant pressure of the heat pump cycle becomes equal to or higher than the predetermined refrigerant pressure.

4. The hot-water supply system according to claim 1, wherein:
when an actual refrigerant pressure becomes smaller than a refrigerant pressure corresponding to the target fluid temperature after the expansion valve is controlled in the first direction, the control unit controls a rotation speed of the compressor to be increased while controlling the expansion valve in any one state of a constant state and a state changing in the second direction, so that the high-pressure side refrigerant pressure of the heat pump cycle becomes equal to or higher than the predetermined refrigerant pressure.

5. The hot-water supply system according to claim 1, wherein:
the control unit controls the pump to adjust a flow amount of the fluid in the fluid passage in accordance with a temperature difference between an actual fluid temperature and the target fluid temperature; and when the actual fluid temperature is lower than the target fluid temperature even after the flow amount of the fluid is reduced by the pump, the control unit increases the high-pressure side refrigerant pressure of the heat pump cycle based on the temperature difference between the actual fluid temperature and the target fluid temperature.

6. The hot-water supply system according to claim 5, wherein:

the control unit controls the expansion valve in the second direction based on the temperature difference between the actual fluid temperature and the target fluid temperature so that the high-pressure side refrigerant pressure becomes equal to or higher than the predetermined refrigerant pressure.

7. The hot-water supply system according to claim 5, wherein the control unit controls a rotation speed of the compressor to be increased while controlling the expansion valve in any one state of a constant state and a state changing in the second direction, so that the high-pressure side refrigerant pressure of the heat pump cycle becomes equal to or higher than the predetermined refrigerant pressure.

8. The hot-water supply system according to claim 1, wherein:

as a refrigerant temperature sucked to the compressor becomes lower, the control unit controls the expansion valve in the second direction so that the high-pressure side refrigerant pressure of the heat pump cycle becomes equal to or higher than the predetermined refrigerant pressure.

9. The hot-water supply system according to claim 1, wherein:

as a refrigerant temperature sucked to the compressor becomes lower, the control unit controls the rotation speed of the compressor to be increased so that the high-pressure side refrigerant pressure of the heat pump cycle becomes equal to or higher than the predetermined refrigerant pressure.

10. The hot-water supply system according to claim 1, wherein:

when an electricity contract is concluded with a power company in which different rates are set for different time zones, the control unit performs the control for maintaining the high-pressure side refrigerant pressure of the heat pump cycle at the target pressure, only in a midnight time zone which is cheapest in power rate.

11. The hot-water supply system according to claim 1, wherein:

the control unit calculates a necessary heating amount of the fluid per day based on an amount and the temperature of the fluid to be daily used by a user, and determines whether or not it is necessary to perform a high-pressure control of the high-pressure side refrigerant pressure of the heat pump cycle to be equal to or higher than the target refrigerant pressure based on a heat storage amount of the fluid in the tank and the necessary heating amount; and the control unit performs the high-pressure control only when it is determined that the high-pressure control is necessary.

12. A hot-water supply system comprising:

a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;

a fluid circuit having therein a tank for storing the fluid for a supply, and a pump for flowing the fluid in the fluid circuit, the tank being connected to the fluid passage of the fluid heat exchanger; and a control unit for controlling a temperature of the fluid to be supplied to a target fluid temperature; wherein:

the control unit controls the operation of the expansion valve in a first direction increasing an opening degree of the expansion valve, when a temperature difference, between a refrigerant temperature at an outlet side of the refrigerant passage in the fluid heat exchanger and a fluid temperature at an inlet side of the fluid passage in the fluid heat exchanger, is smaller than a target temperature difference;

the control unit controls operation of the expansion valve in a second direction decreasing the opening degree of the expansion valve, when the temperature difference is larger than the target temperature difference; and when the control unit determines a heat radiation from the refrigerant to air in the air heat exchanger, the control unit maintains a high-pressure side refrigerant pressure before being decompressed in the heat pump cycle to be higher than a predetermined refrigerant pressure at least until the heat radiation stops.

13. The hot-water supply system according to claim 12, wherein:

the control unit performs at least one of a control reducing the opening degree of the expansion valve and a control increasing a rotation speed of the compressor, so that the high-pressure side refrigerant pressure is increased.

14. The hot-water supply system according to claim 12, further comprising a fan for blowing air toward the air heat exchanger, wherein:

when the control unit detects the heat radiation from the refrigerant to air, the control unit stops the operation of the fan.

15. The hot-water supply system according to claim 12, wherein:

the control unit performs the control for increasing the high-pressure side refrigerant pressure of the heat pump cycle, only in a midnight time zone which is cheapest in power rate.

16. The hot-water supply system according to claim 12, wherein:

the control unit calculates a necessary heating amount of the fluid per day based on an amount and the temperature of the fluid to be daily used by a user, and determines whether or not it is necessary to perform a high-pressure control of the high-pressure side refrigerant pressure of the heat pump cycle to be equal to or higher than the target refrigerant pressure based on a heat storage amount of the fluid in the tank and the necessary heating amount; and the control unit performs the high-pressure control only when it is determined that the high-pressure control is necessary.

17. A hot-water supply system comprising:

a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;

a fluid circuit having therein a tank for storing the fluid for a supply, and a pump for flowing the fluid in the fluid circuit, the tank being connected to the fluid passage of the fluid heat exchanger; and a control unit for controlling a temperature of the fluid to be supplied to a target fluid temperature, wherein:

the control unit controls operation of the expansion valve in a first direction increasing an opening degree of the expansion valve, when a temperature difference, between a refrigerant temperature at an outlet side of the refrigerant passage in the fluid heat exchanger and a fluid temperature at an inlet side of the fluid passage in the fluid heat exchanger, is smaller than a target temperature difference;

the control unit controls operation of the expansion valve in a second direction decreasing the opening degree of the expansion valve, when the temperature difference is larger than the target temperature difference; and when the fluid temperature at an inlet side of the fluid passage in the fluid heat exchanger exceeds a predetermined temperature, the control unit sets a target pressure to an upper limit pressure that is lower than a compression resistance pressure of materials constituting the heat pump cycle, so that the high-pressure side refrigerant pressure of the heat pump cycle corresponds to the target pressure.

18. The hot-water supply system according to claim 17, wherein:

the control unit controls the pump to control a flow amount of the fluid flowing through the fluid passage based on a temperature difference between a fluid temperature at an outlet side of the fluid passage and the target fluid temperature.

19. The hot-water supply system according to claim 18, wherein:

the control unit estimates the high-pressure side refrigerant pressure based on the fluid temperature at the inlet side of the fluid passage in the fluid heat exchanger and a refrigerant temperature at an inlet side of the air heat exchanger, and controls the opening degree of the expansion valve so that the estimated refrigerant pressure corresponds to the upper limit pressure.

20. The hot-water supply system according to claim 17, wherein:

when an electricity contract is concluded with a power company in which different rates are set for different time zones, the control unit performs the control for maintaining the high-pressure side refrigerant pressure of the heat pump cycle at the target pressure, only in a midnight time zone which is cheapest in power rate.

21. The hot-water supply system according to claim 17, wherein:

the control unit calculates a necessary heating amount of the fluid per day based on an amount and the temperature of the fluid to be daily used by a user, and determines whether or not it is necessary to perform a high-pressure control of the high-pressure side refrigerant pressure of the heat pump cycle to correspond to the target refrigerant pressure based on a heat storage amount of the fluid in the tank and the necessary heating amount; and the control unit performs the high-pressure control only when it is determined that the high-pressure control is necessary.

22. A hot-water supply system comprising:

a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;

a fluid circuit having therein a tank for storing the fluid for a supply, and a pump for flowing the fluid in the fluid circuit, the tank being connected to the fluid passage of the fluid heat exchanger; and a control unit for controlling a temperature of the fluid to be supplied to a target fluid temperature, wherein:

the control unit has heat-storing amount calculating means for calculating a heat storage amount based on an amount of fluid in the tank and temperature of the fluid in the tank;

in a midnight time zone in which the power rate is set at the lowest, the control unit starts a boiling-up operation when the heat storage amount of hot water within the tank is smaller than a first predetermined amount, and stops the boiling-up operation when at least one of a first condition, where the temperature of the fluid on the inlet side of the fluid flow passage is higher than a first preset temperature, and a second condition, where the heat storage amount of hot water within the tank becomes larger than the first predetermined amount, is satisfied;

in a morning and evening time zone in which the power rate is set comparatively low, the control unit starts the boiling-up operation when the heat storage amount of the fluid within the tank is smaller than a second predetermined amount, and stops the boiling-up operation when at least one of a third condition, where the temperature of fluid on the inlet side of the fluid flow passage exceeds a second preset temperature, a fourth condition where the heat storage amount of the fluid within the tank is larger than the second predetermined amount, is satisfied; and in a daytime time zone in which the power rate is set high, the control unit starts the boiling-up operation when the heat storage amount of fluid within the tank is smaller than a third predetermined amount, and stops the boiling-up operation when at least one of a fifth condition, where the temperature of the fluid on the inlet side of the fluid flow passage exceeds a third preset temperature, and a second condition, where a heat storage amount of the fluid within the tank reaches the third predetermined amount, is satisfied.

23. A hot-water supply system comprising:

a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;

a fluid circuit having therein a tank for storing the fluid for a supply, and a pump for flowing the fluid in the fluid circuit, the tank being connected to the fluid passage of the fluid heat exchanger; and a control unit for controlling an opening degree of the expansion valve and a capacity of the pump, wherein:

when temperature of the fluid at an inlet side of the fluid passage is lower than a control change temperature, the control unit controls the opening degree of the expansion valve so that a temperature difference between the refrigerant temperature at an outlet side of the refrigerant passage and the fluid temperature at the inlet side of the fluid passage is within a predetermined range; and when the temperature of the fluid at the inlet side of the fluid passage is equal to or higher than the control change temperature, while the control unit controls the capacity of the pump at a constant value, the control unit controls the opening degree of the expansion valve to be increased when the temperature of the fluid at an outlet side of the fluid passage is higher than a first set temperature, and controls the opening degree of the expansion valve to be decreased when the temperature of the fluid at the outlet side of the fluid passage is lower than a second set temperature lower than the first set temperature.

24. The hot-water supply system according to claim 23, wherein the control unit sets the control change temperature to be lower, as a refrigerant pressure discharged from the compressor of the heat pump cycle is lower.

25. The hot-water supply system according to claim 23, wherein the control unit sets the control change temperature to be lower, as one of an outside air temperature and a target fluid supply temperature is lower.

26. A hot-water supply system comprising:

a heat pump cycle including a refrigerant compressor for compressing refrigerant, a refrigerant passage in a fluid heat exchanger for performing a heat exchange with a fluid in a fluid passage, an expansion valve for decompressing refrigerant and an air heat exchanger for performing a heat exchange between refrigerant and air, which are connected to form a closed refrigerant circuit;

a fluid circuit having therein a tank for storing the fluid for a supply, and a pump for flowing the fluid in the fluid circuit, the tank being connected to the fluid passage of the fluid heat exchanger; and a control unit for controlling an opening degree of the expansion valve and a capacity of the pump, wherein:

when temperature of the fluid at an inlet side of the fluid passage is lower than a control change temperature, the control unit controls the opening degree of the expansion valve so that a temperature difference between a refrigerant temperature at an outlet side of the refrigerant passage and the fluid temperature at the inlet side of the fluid passage is within a predetermined range; and when the temperature of the fluid at the inlet side of the fluid passage is equal to or higher than the control change temperature, the control unit controls the opening degree of the expansion valve to be decreased when a refrigerant temperature discharged from an outlet of the compressor is equal to or lower than a first refrigerant set temperature, and controls the opening degree of the expansion valve to be increased when the refrigerant temperature discharged from the outlet of the compressor is equal to or higher than a second refrigerant set temperature set higher than the first refrigerant set temperature; and the control unit controls the capacity of the pump to be increased when the temperature of the fluid at an outlet side of the fluid passage is equal to or higher than a first fluid set temperature, and controls the capacity of the pump to be decreased when the temperature of the fluid at the outlet side of the fluid passage is equal to or lower than a second fluid set temperature lower than the first fluid set temperature.

27. The hot-water supply system according to claim 26, wherein the control unit sets the control change temperature to be lower, as a refrigerant pressure discharged from the compressor of the heat pump cycle is lower.

28. The hot-water supply system according to claim 26, wherein the control unit sets the control change temperature to be lower, as one of an outside air temperature and a target fluid supply temperature is lower.

29. The hot-water supply system according to claim 26, wherein the control unit sets a target refrigerant temperature discharged from the compressor and a target fluid supply temperature in such a manner that a difference between the target refrigerant temperature and the target fluid supply temperature becomes smaller as an outside air temperature becomes higher.

30. The hot-water supply system according to claim 26, wherein an upper limit value of a target fluid supply temperature is set to be lower as an outside air temperature is higher.

* * * * *